(12) United States Patent
Klafter et al.

(10) Patent No.: US 12,361,212 B2
(45) Date of Patent: Jul. 15, 2025

(54) SYSTEM AND METHOD FOR GENERATING AND EXTRACTING DATA FROM MACHINE LEARNING MODEL OUTPUTS

(71) Applicant: Green Swan Labs LTD, Tel Aviv (IL)

(72) Inventors: Joseph Klafter, Rishon Letzion (IL); Boaz Nol, Tel Aviv (IL); Boaz Benrush, Moshav Shavei Tzion (IL); Abraham Kadar, Tel Aviv (IL)

(73) Assignee: Green Swan Labs LTD, Tel Aviv (IL)

( * ) Notice: Subject to any disclaimer, the term of this patent is extended or adjusted under 35 U.S.C. 154(b) by 0 days.

(21) Appl. No.: 18/925,261

(22) Filed: Oct. 24, 2024

(65) Prior Publication Data

US 2025/0156634 A1    May 15, 2025

Related U.S. Application Data

(60) Provisional application No. 63/598,547, filed on Nov. 14, 2023.

(51) Int. Cl.
  *G06F 40/20* (2020.01)
  *G06F 16/953* (2019.01)

(52) U.S. Cl.
  CPC .......... *G06F 40/20* (2020.01); *G06F 16/953* (2019.01)

(58) Field of Classification Search
  CPC ...... G06F 16/953; G06F 40/284; G06F 40/20; G06F 16/9027; G06F 16/3329; G06F 16/9558; G06F 3/167; G06F 40/134; G06F 40/279; G06F 40/30; G06F 40/56; G06F 9/453; G06F 16/583; G06F 16/955; G06F 18/217; G06F 18/285; G06F 16/9535; G06F 16/2455; G06F 12/0246; G06F 12/0813; G06F 16/248; G06F 16/434; G06F 16/9537; G06F 18/254; G06F 2212/7205; G06F 16/29; G06F 16/24575; G06F 16/2471; G06F 16/27; G06F 16/3326;

(Continued)

(56) References Cited

U.S. PATENT DOCUMENTS 12,148,421 B2 * 11/2024 Baeuml ................. G10L 15/183
2020/0175961 A1 * 6/2020 Thomson ................ G10L 15/28

(Continued)

FOREIGN PATENT DOCUMENTS

KR       20200014510         2/2020

*Primary Examiner* — Abdelali Serrou
(74) *Attorney, Agent, or Firm* — PEARL COHEN ZEDEK LATZER BARATZ LLP

(57) ABSTRACT

A system and method for extracting data from large language model (LLM) outputs, including: training a model using labeled data items to assign rankings to LLMs; selecting, by the trained model, one or more of the LLMs based on the rankings; sending an LLM prompt to selected models; and outputting, by the model, a refined response to the prompt based on responses to the prompt by the LLMs. Some LLM prompts according to some embodiments may include different sets input parameters of different types-such as, e.g., a set of block parameters and a set of editorial parameters. In some embodiments, a model or LLM may be updated or retrained using a reinforcement learning approach and based output items or refined responses generated by that model or LLM-which may for example be scored or ranked and used in combination with reward or cost functions to update model parameters.

20 Claims, 20 Drawing Sheets

---

Step 1410: train a machine learning model using labeled data items, where training includes assigning rankings to LLMs Step 1420: select LLMs based on the assigned rankings, and send an LLM prompt to selected LLMs Step 1430: output a refined response to the LLM prompt based on one or more responses to the LLM prompt by the LLMs

(58) Field of Classification Search
CPC ...... G06F 16/335; G06F 16/40; G06F 16/437;
G06F 17/16; G06F 9/5027; G06F
16/24578; G06F 16/951; G06F 16/235;
G06F 16/2425; G06F 16/3338; G06F
16/43; G06F 16/71; G06F 16/90335;
G06F 18/214; G06F 2209/5017; G06F
16/9538; G06F 11/3006; G06F 16/24;
G06F 16/31; G06F 16/33; G06F 16/48;
G06F 16/51; G06F 18/21; G06F 18/256;
G06F 9/546; G06F 11/3065;
11/3072; G06F 11/3409; G06F 16/217;
G06F 16/288; G06F 16/313; G06F
16/3344; G06F 16/3346; G06F 16/3347;
G06F 16/353; G06F 21/6245; G06F
21/6254; G06F 2221/034; G06F 3/0482;
G06F 40/44; G06F 9/5061; G06F
11/2023; G06F 11/273; G06F 11/3055;
G06F 11/3442; G06F 13/16; G06F 15/16;
G06F 16/00; G06F 16/21; G06F 16/2365;
G06F 16/24532; G06F 16/24552; G06F
16/24561; G06F 16/256; G06F 16/258;
G06F 16/38; G06F 16/433; G06F
16/7328; G06F 16/9038; G06F 16/93;
G06F 17/00; G06F 18/2163; G06F 18/22;
G06F 18/24; G06F 18/24143; G06F
21/554; G06F 21/6218; G06F 21/78;
G06F 21/80; G06F 2200/1636; G06F
2201/80; G06F 2203/04104; G06F
2221/2115; G06F 3/01; G06F 3/04186;
G06F 3/0433; G06F 3/04817; G06F
3/04842; G06F 3/0488; G06F 3/0613;
G06F 3/0656; G06F 3/0659; G06F
3/0688; G06F 3/14; G06F 30/20; G06F
9/455; G06F 9/5038; G06F 9/5066; G06F
9/5072; G06F 9/547; G06F 11/3086;
G06F 11/3495; G06F 16/14; G06F
16/152; G06F 16/156; G06F 16/16; G06F
16/1748; G06F 16/215; G06F 16/2379;
G06F 16/5846; G06F 16/5866; G06F
16/90324; G06F 16/907; G06F 18/2135;
G06F 18/23211; G06F 18/2411; G06F
18/253; G06F 21/577; G06F 3/0486;
G06F 3/147; G06F 40/295; G06F 9/4806;
G06F 9/4881; G10L 15/22; G10L 15/32;
G10L 15/30; G10L 15/26; G10L 17/00;
G10L 15/28; G10L 15/063; G10L 15/187;
G10L 15/06; G10L 15/183; G10L 15/197;
G10L 2015/0631; G10L 21/00; G10L
15/10; G10L 2015/227; G10L 25/78
See application file for complete search history.

(56) References Cited

U.S. PATENT DOCUMENTS

| | | | |
|---|---|---|---|
| 2022/0027764 A1 | 1/2022 | Lafond et al. | |
| 2022/0156466 A1* | 5/2022 | Gill | G06F 40/30 |
| 2022/0261631 A1 | 8/2022 | Cohen et al. | |
| 2023/0259705 A1 | 8/2023 | Tunstall-Pedoe et al. | |
| 2024/0220735 A1* | 7/2024 | Gray | G06F 40/56 |
| 2024/0256622 A1* | 8/2024 | Abrams | G06F 16/9538 |
| 2024/0311405 A1* | 9/2024 | Kim | G06F 16/3329 |
| 2024/0330796 A1* | 10/2024 | Pandey | G06F 40/279 |
| 2024/0354346 A1* | 10/2024 | Lott | G06F 16/9027 |
| 2024/0354436 A1* | 10/2024 | Mukherjee | G06F 16/3344 |
| 2024/0370472 A1* | 11/2024 | Madisetti | G06F 40/30 |
| 2024/0370660 A1* | 11/2024 | Cha | G06T 11/00 |

* cited by examiner

Building Blocks — 308

- 001-Company Overview
- 002-Industry Overview
- 003-Total Addressable Market
- 004-Product Analysis
- 005-News & Social Media Analysis
- 006-ESG
- 007-Regulatory Considerations
- 008-Patents
- 009-Five Forces
- ADD NEW BLOCK +

302 — Templates | Search a report on... | Select a report type

- STARTUP ANALYSIS — NEW — Startup Analysis 3 — PREVIEW | EDIT →
- NEWS AND SOCIAL MEDIA ANALYSIS — News and Social Media Analysis — PREVIEW | EDIT →
- TEAM ANALYSIS — NEW — Team Analysis — PREVIEW | EDIT →
- SWOT, SOAR AND FIVE FORCES ANALYSIS — SWOT, SOAR and Five Forces Analysis — PREVIEW | EDIT →

304 — Edit Parameters

STARTUP NAME

STARTUP WEBSITE

SAVE

306 — Editorial OR Jump to workspace →

Beginning of chat

You want to create a VC_1 report on Startup Analysis 3. In your own words, please tell us what you are looking for. For example: 'a VC_1 report on Tesla'.

Summary

Industry Overview
The freight forwarding industry is a crucial element of the global logistics sector, offering services related to the transportation and coordination of goods across various modes of transport. The industry is marked by a fragmented landscape with a mix of dominant global players and smaller regional firms, leading to complex dynamics and intense competition. The industry has seen steady growth in recent years, driven by factors such as increasing global trade, the rise of e-commerce, and the growing need for efficient supply chain solutions. However, the industry has lagged in digital transformation, leading to challenges such as longer delivery times, higher shipping costs, and significant delays. Key players in this industry include global freight forwarders such as Kuehne + Nagel, DHL, and DB Schenker, as well as emerging digital freight forwarders who are leveraging technology to enhance efficiency. The industry serves a diverse range of customers, from small and medium-sized businesses to large enterprises, across various industries, indicating its mass-market appeal.

Sources: The data sources for this industry overview include Statista, IBISWorld, McKinsey Global Institute, FreightWaves, Transport Intelligence, Allied Market Research, company websites (Kuehne + Nagel, DHL, DB Schenker), industry reports, market research firms, Armstrong & Associates, Freightos, and McKinsey & Company

312

Block Configuration:

revlon

INSTRUCTION
no particular instruction

CONTEXT
The block provides information on the material

FIG. 3B

| Template: Startup analysis | | Report: Tesla startup analysis | |
|---|---|---|---|
| Startup description | | Section #1 | |
| Block Parameters | | Final Output | |
| Prompt: Provide a two-sentence description of the startup. Include key information on its products or services, founding year, key leadership team members, and any notable achievements or milestones achieved to date. | ← 502 | Tesla, founded in 2003, is a leading electric vehicle manufacturer known for its innovative products including electric cars, solar energy solutions, and energy storage systems. Led by CEO Elon Musk, Tesla has achieved significant milestones such as the launch of the Model S, Model 3, Model X, and Model Y, and has been at the forefront of advancing autonomous driving technology. | |
| | | Editorial Parameters | |
| | | Company name: Tesla | ⎫ |
| | | Report type: Startup Analysis | ⎬ 504 |
| | | Language: English | |
| | | User: Fund manager | ⎭ |
| Business Model | ⎫ | Section #2 | |
| Traction | ⎬ 506 | Section #3 | |
| Success chance | ⎭ | Section #4 | |

```
name: 'Company Overview'
prompt:"
# Provide an overview of the company including:
  - introduction
  - founders
  - founded date
  - ARR
  - valuation
  - location
  - number of employees
  - raised funds
  - list of investors
  - success score vs industry average
  - TAM
"
format_type: "python dict"
format_output: {
"introduction": "",
"founders": "",
"founded_date": "",
"arr": "",
"valuation": "",
"location": "",
"number_of_employees": "",
"raised_funds": "",
"list_of_investors": "",
"success_score_vs_industry_average": "",
"tam": ""}
```

FIG. 6

```
1  ▼ {
2      "_id" : ObjectId("66ba289dd414cdb227afbf53"),
3      "name" : "Startup Analysis 3",
4      "owner" : ObjectId("6672bb980e5e59b0ee001987"),
5      "type" : "Startup Analysis",
6      "ownerType" : "USER",
7      "thumbnail" : "https://res.cloudinary.com/cajan33/image/upload/v1718347922/blob_xhjpb3.png",
8    ▶ "editorialsParameters" : {
         "startup_name" : "hourone",
         "startup_website" : "https://hourone.ai/"
9      },
10
11
12   ▶ "blocks" : [
13   ▲     {...}
280  ▲     {...}
510  ▲     {...}
542  ▲     {...}
704  ▲     {...}
331  ▲     {...}
188  ▲     {...}
335      ],
336  ▶ "webSearch" : {...},
352     "editable" : true,
353     "copyable" : true,
354     "published" : true,
355     "archived" : false,
356  ▶ "sharedwith" : [...],
368     "order" : NumberInt(0),
369     "createdAt" : ISODate("2024-08-08T12:40:25.284+0000"),
370     "updatedAt" : ISODate("2024-08-14T08:11:17.413+0000"),
371     "_v" : NumberInt(2)
372  }
```

```
const question = 'you are a mckinsey senior analyst and you write a report with these parameters: ${cleanUpJSONContent(
    JSON.stringify(editorial_parameters),
)}. You are asked to write block ${
    block_template.name
} with this description: ${
    block_template.prompt
} this is the context: ${cleanUpJSONContent(
    JSON.stringify(block_parameters),
)}. The output should be a ${
    block_template.format_type
} and exactly match this javascript object template (exact same keys and values): ${cleanUpJSONContent(
    JSON.stringify(block_template.format_output),
)}. Always replace the variables names from the format with very accurate data. Make sure to stay coherent as we cannot predict what happened after 2024. Here is scrapped data to base your analysis on: ${cleanUpJSONContent(
    JSON.stringify(search_data),
)}. ${additionalData}';
```

FIG. 6 (Cont.)

```
608 ─┐
     const question = '
     From this list of answers from different experts that are answering the same question,
     output exactly one JavaScript parsable dictionary (don't output a list) with a smartly merged consensus answer
     that has exactly the same format and number of variables as each one of the answers.
     In order to build this smartly merged consensus answer, depending on the input:
     1) Try to extract the important data from each input. If the data is fake or made up, ignore it.
     2) If it's similar text: summarize, aggregate, and create new sentences from this data. It's really important
        that the final texts are different and unrecognizable from the expert answers. Never follow the structure of
        ideas of any of the expert answers, especially not the first answer.
     2bis) If it's a dataset: cherry-pick the right rows from each dataset and try to reconcile the dataset based on
        the inputs. Keep the same number of values as each of the input for the final output.
     3) Remove useless, fake, made up or general data. But don't remove keys, only values.
     4) Make sure you follow the same output format and include every key and every value.
     5) Important! If the language is specified here: ${cleanUpJSONContent(JSON.stringify(editorialParameters))},
        use the report language as the language for consensus answer. Else use English.
     Expert answers: ${cleanUpJSONContent(JSON.stringify(llmAnswers))}`
```

```
"data": {
  "block_name": "Total Addressable Market",
  "chatgpt": {
    "ranking": "4.2/10",
    "grade": "21%",
    "graph_title": "Total Addressable Market for AI and Machine Learning (2020, 2023, 2026)",
    "years": [
      "2020",
      "2023",
      "2026"
    ],
    "market_sizes": [
      "$327.5 billion",
      "$500 billion",
      "$850 billion"
    ],
    "data_sources": "Sources: McKinsey Global Institute, Gartner, Statista",
    "cagr": [
      "15.15%",
      "19.35%"
    ]
  },
  "claude": {
    "ranking": "4.8/10",
    "grade": "24%",
    "graph_title": "Global Machine Learning Market Size Forecast (2020-2026)",
    "years": [
      "2020",
      "2023",
      "2026"
    ],
    "market_sizes": [
      "$11.3 billion",
      "$25.1 billion",
      "$76.8 billion"
    ],
    "data_sources": "MarketsandMarkets Analysis, Grand View Research, McKinsey & Company",
    "cagr": [
      "30.48%",
      "45.18%"
    ]
  },
```

FIG. 9A

```
902C — "mistral": {
          "ranking": "4.2/10",
          "grade": "21%",
          "graph_title": "Global Artificial Intelligence Industry Market Size: 2020, 2023, 2026",
          "years": [
            "2020",
            "2023",
            "2026"
          ],
          "market_sizes": [
            "$150 billion",
            "$350 billion",
            "$650 billion"
          ],
          "data_sources": "AI Market size estimations are based on research from Statista, Tractica, and McKinsey & Company reports.",
          "cagr": [
            "32.64%",
            "22.92%"
          ]
        },
902D — "cohere": {
          "ranking": "6.8/10",
          "grade": "34%",
          "graph_title": "Total Addressable Market for Wisor's AI Solutions",
          "years": [
            "2020",
            "2023",
            "2026"
          ],
          "market_sizes": [
            "$1.5 billion",
            "$2.3 billion",
            "$3.2 billion"
          ],
          "data_sources": "McKinsey Industry Insights, Gartner AI Market Report 2021, Wisor.ai website",
          "cagr": [
            "15.31%",
            "11.64%"
          ]
        }
      ]
```

FIG. 9A (Cont.)

```
908 ─ "final_output": {
         "years" : [
              "2020",
              "2023",
              "2026"
         ], "market_sizes" : [
              "$105.95 billion",
              "$192.88 billion",
              "$282.65 billion"
         ],
         "data_sources" : "McKinsey, Gartner, Statista, Armstrong & Associates",
         "graph_title" : "Global Total Addressable Market for Freight Forwarding and AI Solutions (2020-2026)",
         "cagr" : [
              "22.1%",
              "13.58%"
         ]
     }
```

FIG. 9B

Web Search

(Simplified) Web Search Prompt:
"Output 3 search queries that I can look for in google search to get content about these (block parameters).
The objective is to write a report on these (editorial parameters)."

Web Search Module:
1) Collect 3 keywords to discover content about the topic using Web Search Prompt.
2) Scrape Google Search
3) Automatically type in all keywords
4) Scrape top 10 results text
5) Summarize

| | Id | Template | Block | Industry | Location | Language | Consensus | Feedback | LLM Used |
|---|---|---|---|---|---|---|---|---|---|
| 1 | Block_1 | startup analysis | startup description | electric vehicles | California | English | function 1 | 100% positive | Mistral, Cohere, ChatGPT |
| 2 | Block_2 | startup analysis | startup description | Generative AI | Tel Aviv | Hebrew | function 1 | 50% positive | Perplexity |
| 3 | Block_3 | startup analysis | startup description | Batteries | Tokyo | Japanese | function 1 | 70% positive | Llama |
| 4 | Block_4 | startup analysis | startup description | Cannabis | Toronto | French | function 1 | 0% positive | Llama, Mistral, Cohere, ChatGPT |

FIG. 11

| Id | Prompt | Final output | Feedback Score |
|---|---|---|---|
| Block_1 | Output a company description of Tesla | Tesla is an electric vehicle and clean energy company known for producing electric cars, battery energy storage systems, solar panels, and related products and services. The company aims to accelerate the transition to sustainable energy. | 100% |
| Block_2 | Output a company description of SpaceX | SpaceX is an aerospace manufacturer and space transportation company. It designs, manufactures, and launches advanced rockets and spacecraft. SpaceX's mission is to make space travel more affordable and enable the colonization of Mars. | 50% |
| Block_3 | Output a company description of SolarCity | SolarCity was a solar energy services company, now part of Tesla's Energy division. It provides solar power systems for residential, commercial, and industrial customers, with a focus on renewable energy solutions. | 70% |
| Block_4 | Output a company description of Neuralink | Neuralink is a neurotechnology company developing implantable brain-machine interfaces (BMIs). The company's goal is to create devices that allow for seamless interaction between the human brain and computers, potentially addressing neurological diseases and disorders. | 0% |

FIG. 13

SYSTEM AND METHOD FOR GENERATING AND EXTRACTING DATA FROM MACHINE LEARNING MODEL OUTPUTS

PRIOR APPLICATION DATA

The present application claims benefit from prior U.S. Provisional Application 63/598,547, filed on Nov. 14, 2023, and entitled "INNOVATIVE SELF-TRAINED LLM FOR EXTRACTING RELIABLE DATA", which is incorporated by reference herein in its entirety.

FIELD OF THE INVENTION

The present invention relates generally to generative artificial intelligence technology, and more specifically to a machine learning approach for consolidating output data produced by a plurality of different generative models.

BACKGROUND OF THE INVENTION

Large language models (LLMs) are increasingly used in critical applications such as healthcare, finance, and legal advice. Despite their impressive capabilities, LLMs can sometimes produce incorrect, biased, or misleading information, e.g., due to the limitations of their training data and inherent stochastic nature. Ensuring the reliability of LLM outputs is essential to maintain trust, accuracy, and safety in their applications.

In the rapidly evolving landscape of artificial intelligence (AI), leveraging multiple LLMs for diverse applications has become increasingly common due to their specialized strengths and capabilities. However, the growing number of LLMs presents a challenge: effectively mapping specific questions or queries to the most suitable model and consolidating their outputs into a coherent, accurate response. This need arises from the variability in performance and expertise across different models or LLMs-some excel in generating creative content, while others are more proficient in factual accuracy or domain-specific knowledge. A technology solution that can intelligently route queries to the optimal LLM and integrate their responses would enhance the overall quality and/or reliability of AI-generated content. Such a system would not only streamline the utilization of multiple LLMs but also maximize their individual strengths, providing users with more precise and contextually appropriate answers.

SUMMARY

Some embodiments of the invention may provide a system and method for extracting data from large language model (LLM) outputs.

Some embodiments of the invention may include, e.g.: training a model using labeled data items to assign rankings to models or NNs such as LLMs; selecting, by the trained model, one or more of the LLMs based on the rankings; sending an LLM prompt to selected models; and outputting, by the model, a refined response to the prompt based on responses to the prompt by the LLMs.

Some model, NN, GenAI, or LLM prompts according to some embodiments may include different sets of input parameters of different types-such as, e.g., a set of block parameters and a set of editorial parameters. In some embodiments, a model or LLM may be updated or retrained using a reinforcement learning approach and based output items or refined responses generated by that model or LLM-which may for example be scored or ranked and used in combination with reward or cost functions to update model parameters. Updating or retraining a model or LLM according to some embodiments may be performed automatically (e.g., without requiring an intervention from a human user), and may be referred to as "self-training".

In some embodiments, different labeled datasets may be constructed or assembled to represent specific topics or domains, and/or may be associated parameters (such as for example block and/or editorial parameters), and a model or LLM may be trained, retrained or refined using such specific datasets to provide optimized outputs and/or refined responses for that given topic or domain (as represented, e.g., by the parameters with which the relevant dataset may be associated).

BRIEF DESCRIPTION OF THE DRAWINGS

Non-limiting examples of embodiments of the disclosure are described below with reference to figures attached hereto. Dimensions of features shown in the figures are chosen for convenience and clarity of presentation and are not necessarily shown to scale. The subject matter regarded as the invention is particularly pointed out and distinctly claimed in the concluding portion of the specification. The invention, however, both as to organization and method of operation, together with objects, features, and advantages thereof, can be understood by reference to the following detailed description when read with the accompanied drawings. Embodiments are illustrated without limitation in the figures, in which like reference numerals may indicate corresponding, analogous, or similar elements, and in which:

FIGS. 3A-B show example user interface components according to some embodiments of the invention;

FIG. 5 shows example block parameters, editorial parameters, and output block according to some embodiments of the invention;

FIG. 6 shows some example data structures that may be used in some embodiments of the invention;

FIG. 8 shows an example use of a parsing prompt according to some embodiments of the invention;

FIG. 9A-B shows example outputs by a plurality of large language models and an example final output produced according to some embodiments of the invention;

FIG. 10 shows an example web search process according to some embodiments of the invention;

FIG. 11 shows an example database which may be used in model training and/or mapping according to some embodiments of the invention;

FIG. 13 shows an example dataset of prompts and corresponding outputs and feedback scores according to some embodiments of the invention.

It will be appreciated that for simplicity and clarity of illustration, elements shown in the figures have not necessarily been drawn accurately or to scale. For example, the dimensions of some of the elements can be exaggerated relative to other elements for clarity, or several physical components can be included in one functional block or element.

DETAILED DESCRIPTION

In the following detailed description, numerous specific details are set forth in order to provide a thorough understanding of the invention. However, it will be understood by those skilled in the art that the present invention can be practiced without these specific details. In other instances, well-known methods, procedures, components, modules, units and/or circuits have not been described in detail so as not to obscure the invention.

Some embodiments of the invention may allow sending an input data item (such as for example a question, prompt or query) to a plurality of models such as large language models (LLMs); processing or consolidating outputs produced by the LLMs in response to the input item (which may for example include aggregating or omitting contents from the different responses); and generating a final output, or outputting a final response (which may be e.g., an answer to the question/prompt/query) based on processing or consolidation results. Some embodiments may select or map a specific input such as, e.g., a question/query/prompt—or a topic with which the input may be associated—to LLMs that are expected to provide desirable outputs for the input (e.g., a satisfactory or reliable answer to a given question). Some embodiments may include using standardized data structures including specific parameters or variables to create a labeled dataset—which may be used for continuous training of a machine learning model or LLM for extracting data from a plurality of LLM outputs, or for producing outputs independently from models or LLMs previously used in model mapping and producing response which were later consolidated or unified.

Figure 1:
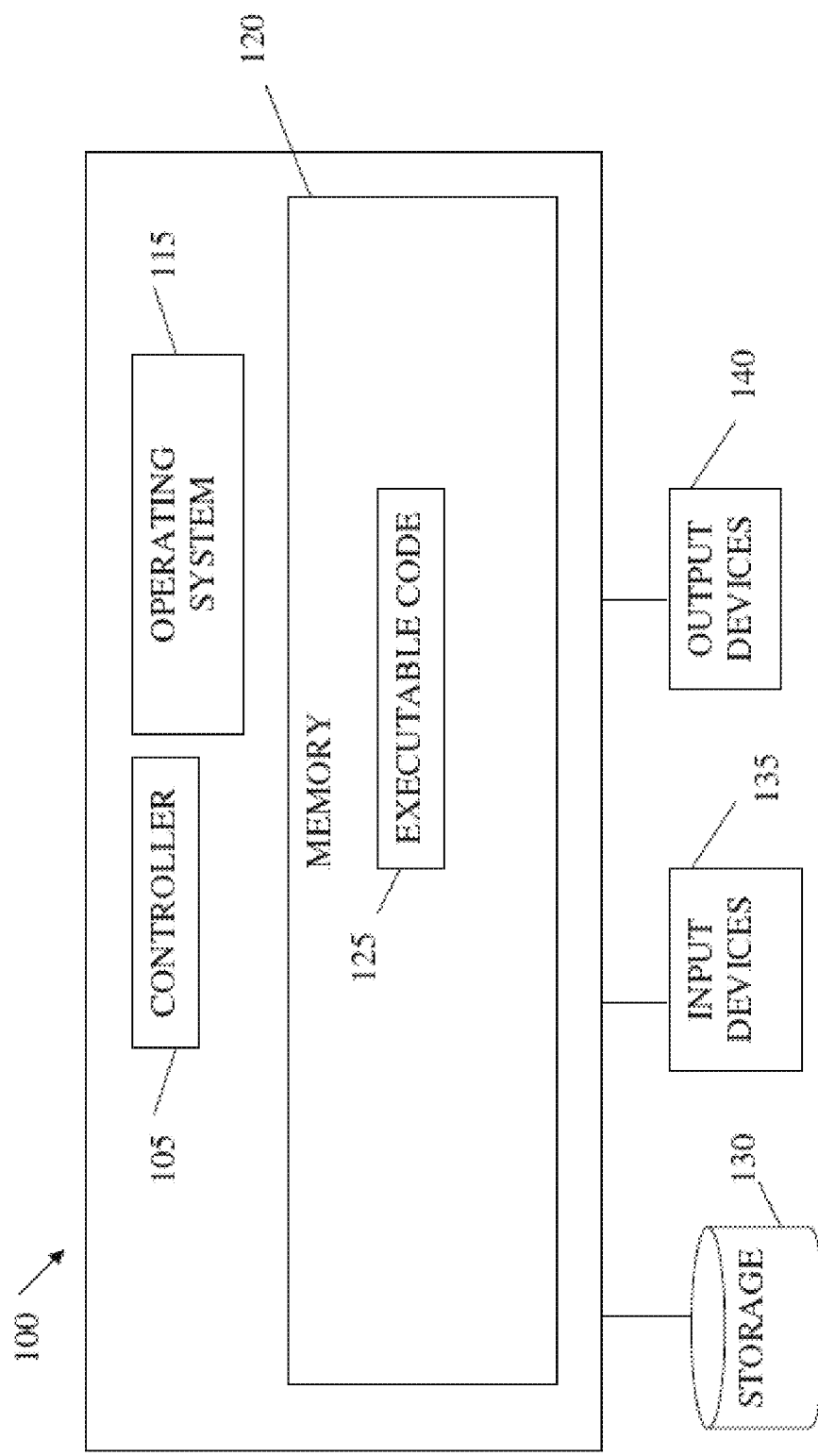
FIG. 1 is a high-level block diagram of an exemplary computing device which may be used with embodiments of the present invention.

FIG. 1 shows a high-level block diagram of an exemplary computing device which may be used with embodiments of the present invention. Computing device 100 may include a controller or computer processor 105 that may be, for example, a central processing unit processor (CPU), graphics processing unit (GPU), a chip or any suitable computing device, an operating system 115, a memory 120, a storage 130, input devices 135 and output devices 140 such as a computer display or monitor displaying for example a computer desktop system.

Operating system 115 may be or may include code to perform tasks involving coordination, scheduling, arbitration, or managing operation of computing device 100, for example, scheduling execution of programs. Memory 120 may be or may include, for example, a Random Access Memory (RAM), a read only memory (ROM), a Flash memory, a volatile or non-volatile memory, or other suitable memory units or storage units. Memory 120 may be or may include a plurality of different memory units. Memory 120 may store for example, instructions (e.g. code 125) to carry out a method as disclosed herein, and/or output data, etc.

Executable code 125 may be any application, program, process, task, or script. Executable code 125 may be executed by controller 105 possibly under control of operating system 115. For example, executable code 125 may be or execute one or more applications performing methods as disclosed herein. In some embodiments, more than one computing device 100 or components of device 100 may be used. One or more processor(s) 105 may be configured to carry out embodiments of the present invention by for example executing software or code. Storage 130 may be or may include, for example, a hard disk drive, a floppy disk drive, a compact disk (CD) drive, a universal serial bus (USB) device or other suitable removable and/or fixed storage unit. Data described herein may be stored in a storage 130 and may be loaded from storage 130 into a memory 120 where it may be processed by controller 105.

Input devices 135 may be or may include a mouse, a keyboard, a touch screen or pad or any suitable input device or combination of devices. Output devices 140 may include one or more displays, speakers and/or any other suitable output devices or combination of output devices. Any applicable input/output (I/O) devices may be connected to computing device 100, for example, a wired or wireless network interface card (NIC), a modem, printer, a universal serial bus (USB) device or external hard drive may be included in input devices 135 and/or output devices 140.

Embodiments of the invention may include one or more article(s) (e.g. memory 120 or storage 130) such as a computer or processor non-transitory readable medium, or a computer or processor non-transitory storage medium, such as for example a memory, a disk drive, or a USB flash memory encoding, including, or storing instructions, e.g., computer-executable instructions, which, when executed by a processor or controller, carry out methods and procedures disclosed herein.

A user or client as described herein may refer to, e.g., a computer system performing operations, e.g., over a communication network-such for example sending or transmitting data items or parameters (such as for example editorial parameters) to a server or cloud platform over a communication or data network, e.g., for generating prompts which may be used to generate outputs or responses by machine learning or large language models according to some embodiments of the invention. While some user or client computer systems may be operated by a human user (using, e.g., appropriate input devices) in some embodiments of the invention, some such systems may require no manual intervention from a human user in other embodiments.

Figure 2:
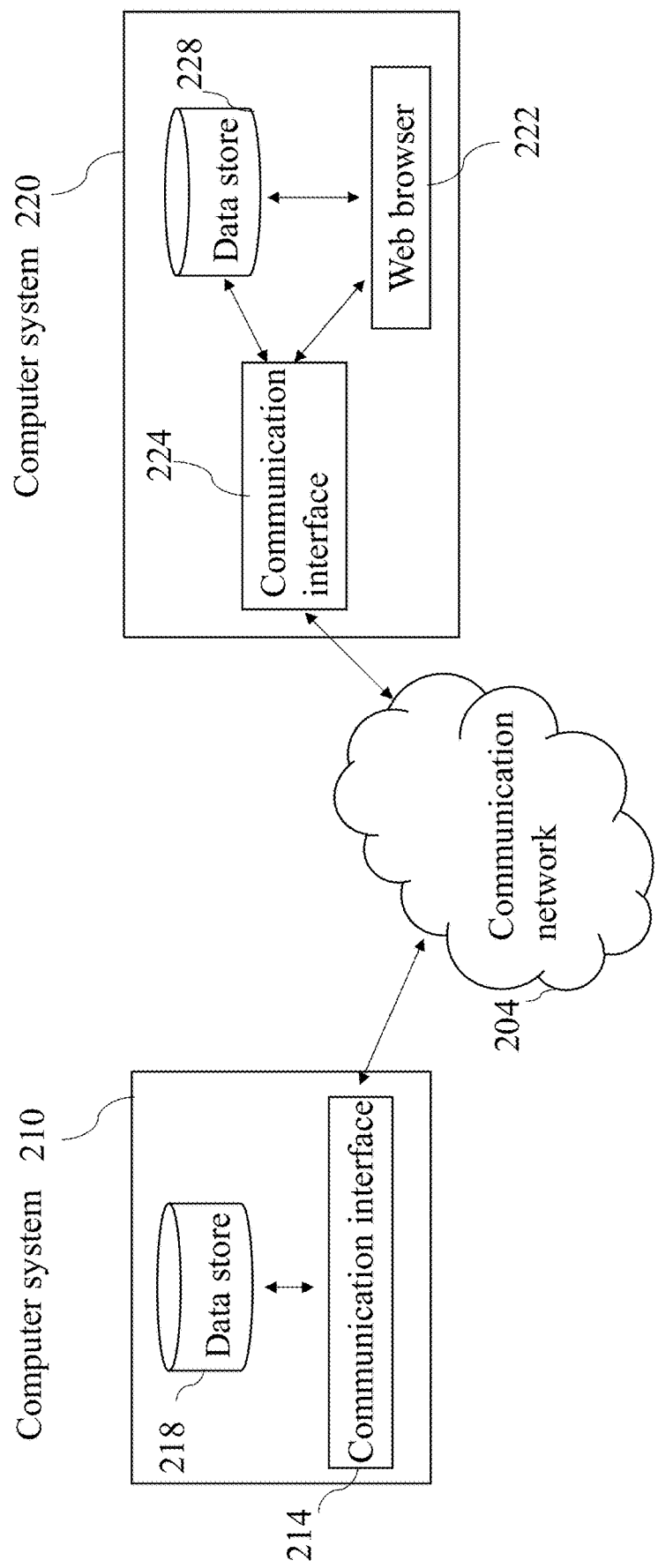
FIG. 2 shows example computer systems remotely connected by a data network according to some embodiments of the invention.

FIG. 2 shows example computer systems remotely connected by a data network according to some embodiments of the invention.

Some embodiments of the invention may include performing an exchange of data or data transfer between remotely connected computer devices. For example, remote computer 210 may send or transmit, over communication or data network 204, computerized data items, data elements, or data points of information-such as for example LLM or GenAI prompts, input data items (such as, e.g., block and/or editorial parameters, data or information items from a client database or from a web search, feedback and/or scores from a user, and the like), output data items (such as for example answers or responses from LLMs, consolidated or refined responses or answers, blocks, reports, and the like)—to computerized system 220, and/or vice versa. Each of systems 210 and 220 may be or may include the various components described with reference to system 100, as well as other computer systems, and include and/or operate or perform, e.g., the various corresponding protocols and procedures described herein. In some embodiments, computerized systems 210 and 220 may additionally perform a plurality of operations including for example sending and/or transmitting and/or collecting and/or receiving additional data to or from additional remote computers systems. One skilled in the art may recognize that additional and/or alternative remote and/or computerized systems and/or network and connectivity types may be included in different embodiments of the invention.

In some embodiments of the invention, computer systems 210 and 220 may communicate via data or communication or data network 204 via appropriate communication interfaces 214 and 224, respectively-which may be for example NICs or network adapters as known in the art. Computerized systems 210 and/or 220 may include data stores such as, e.g., 218 and 228 which may for example include a plurality of received data items, messages, requests, reports, and the like, such as for example described herein.

In some embodiments a machine learning model or LLM (such as for example a "self-trained" LLM) may extract and/or aggregate data received or generated by LLMs and/or generative artificial intelligence (AI or GenAI) models or systems.

"Self-training" according to some embodiments may refer to a model training procedure where, e.g., outputs produced by the model and/or feedback or scores received for model outputs (such as for example reports produced by some embodiments of the invention) may be used for updating or tuning model parameters, for example in real time and/or periodically. A self trained model according to some embodiments may be trained using output data produced by the model, and, e.g., without relying on training data from external databases and/or sources of information. According to some embodiments, model operation and tuning, training or retraining may take place simultaneously or concurrently.

To perform a plurality of the functionalities described herein, some embodiments may use a machine learning or neural network model which may be, e.g., a general-purpose artificial intelligence or generative artificial intelligence (GenAI) model such as for example OpenAI's GPT-4, Google's BERT, and Meta's LLaMA models—for example using appropriate application programming interfaces (APIs) by the relevant models or platforms. Additional or alternative models, or models developed and/or trained from scratch may be used in different embodiments. Some embodiments may include a plurality of different machine learning or GenAI models, where different models may, e.g., be used for performing different functionalities (for example, model A may perform the consensus functionality, model B may perform the parsing functionality, and the like).

According to some embodiments, a model for extracting data from generative AI model or LLM outputs, or for refining or consolidating LLM responses, may be for example one of the LLMs to which prompts are sent and which may produce answers or responses to the prompt—or may be a different and/or separate machine learning model or LLM which may run, be implemented or be executed using dedicated computer systems. In some embodiments, computerized systems used for implementing or executing a machine learning model for extracting data from LLM or GenAI outputs may physically separate from systems used for running or executing the models or LLMs producing or generating responses to be refined and/or consolidated. Different models and/or corresponding computerized systems may be connected over a communication or data network, and accordingly send or transmit data items over the network as part of various operations such as, e.g., described herein.

In some embodiments, a machine learning model or LLM may be implemented, e.g., using a computer system or a plurality of computer systems (such as, e.g., example systems described herein with regard to FIGS. 1-2). Other types of models or NNs may be used. In some embodiments, the LLM may be implemented as a cloud-based service, where a computer system e.g. at a server farm, remote from user computer systems, hosts and executes model capability. For example, the LLM may be hosted on a server in the cloud and can be accessed by users over a communication or data network. In other embodiments, the LLM may be implemented as a mobile app, and may for example be installed on a mobile device or smartphone, e.g., to answer questions offline. A machine learning model or LLM may be, e.g., a transformer-architecture based model which may include for example:

Input layer/embedding layer: an input data item or file may be converted into numerical representations or vector embeddings which may capture the semantic meaning of words and may be enhanced, e.g., by positional encodings techniques, to maintain or represent orderings of words in a sequence. As part of calculating vector embeddings for input data items or files, some embodiments may use embedding calculation techniques and approaches such as, for example, Word2Vec, Global Vectors for Word Representation (GloVe), FastText, BERT Embeddings, Embeddings from Language Models (ELMo), and the like—although other methods or procedures may be used in other embodiments.

Encoder and/or decoder structure: where an encoder component may process and compress the input data into a context-rich representation, and/or a decoder component may generate an output by expanding this representation into a desired format. Some encoders/decoders may include, e.g., Bidirectional Encoder Representations from Transformers (BERT), Generative Pre-trained Transformer (GPT), Text-to-Text Transfer Transformer T5, and the like.

Multi-head self-attention: this mechanism may allow the model to focus on different parts of the input text, e.g., simultaneously. For example each "head" in the multi-head attention mechanism may learn or may be trained to pay attention to different aspects of the text, such as syntax, semantics, context information (relating to, e.g., words or sentences adjacent to a given word or sentence, and the like).

Feed-forward neural networks: an output of, e.g., a self-attention mechanism may be passed through, e.g., fully connected feed-forward layers. These layers may be applied to different positions, segments, or parts of an input or sequence of words independently and may share, for example, the same neural weights across all segments or positions.

Layer normalization and residual connections: to stabilize training and improve convergence, the model may use or include layer normalization and residual connections, which may help in managing the flow of gradients, for example, during procedures or processes such as, e.g., backpropagation, making it easier to train deep networks.

Stacked layers: the architecture may involve stacking multiple layers of attention and feed-forward networks on top of each other. Each layer may refine the representation of the input text further, capturing increasingly complex features.

Output layer: the final layer may be a SoftMax layer or function that may convert the processed input or data, e.g., into probabilities over a vocabulary, which may allow for predicting the next word in the sequence.

Training objective: an example model may be trained using a large dataset or corpus of text data (which may include, for example, a plurality of labeled or scored final outputs or responses produced by the model) with a loss function that may involve predicting the next word in a sequence (which may be referred to as causal language modeling). An "objective" or loss criterion may be to minimize the difference between the predicted word and the actual next word in the training data.

Such example components may allow machine learning models or LLMs according to some embodiments of the invention to generate coherent, contextually relevant text, capture long-range dependencies and relationships, and understand complex language patterns. Additional or alternative components, subcomponents or architectural elements may be used in different embodiments of the invention.

A model or LLM may be trained on a large dataset or datasets including, e.g., text and code and/or additional data items. In some embodiments, a training dataset may include for example various data or information items in text format, and/or code segments using various programming languages. In some embodiments, a dedicated, labeled dataset or datasets may be used for model training or retraining. Example labeled datasets that may be used for training according to some embodiments are provided in Tables 1-2 and FIGS. 11, 13.

Some embodiments may include training an LLM to consolidate and/or extract data from the outputs of other LLMs (which may, e.g., provide outputs or responses being potentially unreliable). In some embodiments, training may involve several operations, such as for example gathering samples labeled or scored, e.g., as either "reliable" and "unreliable" and/or given scores or ranks for their reliability or desirability (e.g., based on users' feedback. Numeric scores may be converted into binary scores such as, e.g., "reliable" and "unreliable" or "positive" or "negative" such as for example demonstrated herein). Samples or training data items may for example be sourced from synthetic data and/or from non-LLM samples, and/or from real-world LLM outputs. See, e.g., specific non-limiting examples herein.

Some models according to some embodiments may be or may include an online model, and data items may be received or collected, and used for retraining or refining the model in real time, e.g., to enable continuously tuning, updating or improving the model based on new outputs, newly received feedback, and real-world usage.

As further discussed herein an example intelligent, machine learning or GenAI approach or framework according to some embodiments may include representing, storing, or generating prompts, e.g., using templates and as part of reports including multiple blocks—where different blocks may be associated with different features and/or keywords and/or metadata, and where prompts may include a plurality of parameters such as, e.g., ones referred to herein as "block parameters" and "editorial parameters". In some embodiments, model training or tuning (e.g., "self-training") may take place continuously or periodically-such as for example:

Some embodiments may create and store block features, data or metadata (which may include, for example, which report or template may be used in a given report or answer generation task, which block of a specific template may be used, keywords such as an industry or location the report or block may relate to, a language it may be written in, a consensus function used, and the like), feedback scores or metrics for a given report or block (which may be for example a percentage of positive feedback, where, e.g., 100% may designate purely positive feedback by a client or user of the generated report, and 0% may designate purely negative feedback by the client) and data or information describing the LLM(s) used in a given data generation pipeline (and used, e.g., to generate outputs prior to refining or integrating a plurality of outputs according to some embodiments).

For each LLM, some embodiments may include training, for example, a linear regression model (or a different model) using the data where the model was used-which may enable for example to predict feedback and model performance scores or metrics (which may be helpful, e.g., in cases where only limited feedback data may be available). For example, the model may take as input a plurality of features (e.g., according to feature selection techniques, where a target or goal, as may be implemented in appropriate cost or reward functions, may be maximizing the accuracy of predicting correct scores or values of positive feedback, e.g., of a given time period). The model may then output a prediction of how positive a feedback score for a given output item (such as for example a block or report) may be.

Feedback data and prediction or inference data may be used to predict which model may perform better for a given block or report (for example based on feedback scores or predicted scores for blocks or reports sharing similar features, data or metadata with the report or block considered) and embodiments may accordingly refine or optimize a selection or mapping of a question or input item to a plurality of models or LLMs based on feedback score or predicted data. As a nonlimiting example, given a report generation task associated with a feature, keyword, or topic of "language generation", some embodiments may rank a plurality of models or model selections which may be used for tasks associated with that feature or keyword, and may for instance select, e.g., the N=5 models having the highest average feedback scores or predicted scores for all generation tasks, reports, or blocks associated with this keyword or feature. In this context, some embodiments may include or use, for a given topic or keyword, a list or set of ranked models and corresponding rankings based on which model mapping may be performed and models may be selected, e.g., for text generation tasks. An example ranked model set or list may include a plurality of entries, e.g., of the form (rank, model_name, average_feedback_score) for a given topic or keyword such as "startup_analysis". Such an example set or list may be produced using labeled or scored datasets or databases such as for example provided herein and may be, e.g., ["startup_analysis", {(1, GPT_4.0, 92.2%), (2, Claude_3, 87.9%), . . . }]. Additional or alternative data structures may be used in different embodiments.

In some embodiments, model mapping may be performed based on scores or rankings and/or based on relevant benchmarks or sources of information. In some embodiments the mapping process may be performed by a machine learning model or LLM which may be trained, e.g., using labeled datasets such as for example described herein. Additional or alternative model selection or mapping conditions or criteria may be embedded in model training or fine tuning procedures according to different embodiments (and may be documented or represented, e.g., in neural weights along different neural network layers).

According to some embodiments, model training, self training, retraining or fine tuning may include for example:

An example model may be trained on labeled datasets of block or report outputs generated by in initial pipeline (e.g., by different selected or mapped LLMs, prior to performing a consensus or peer review mechanism such as, e.g., described herein).

Each LLM may produce outputs that may be taken into account when performing or executing the consensus mechanism (for example assuming they were selected by the mapping algorithm) and the output may, in some embodiments, be modified by other LLM and consensus modules.

Outputs may be scored (e.g., using feedback or predicted scores), and outputs may be associated with calculated scores and may be stored in a dedicated database.

In accordance with a "garbage-in garbage-out" concept, some embodiments may revise or update training datasets for example to filter or "cherry pick" the data that triggered or resulted in the most positive feedback or score. The more data generated and used for training or retraining the model, the more positive the feedback of the filtered or cherry picked dataset may be—as the model's performance in mapping and performing consensus or peer review, e.g., as reflected in feedback or predicted scores, may improve over time. Some embodiments may therefore provide a self training or fine tuning mechanism, which may for example require that a given training data set at a given training or fine tuning may include N data items (where N may be, e.g., $10^5$ items), where the N items may be selected from M items (requiring N<M), and where the selection is performed such that the N highest scored items among the M items are used for training or fine tuning. Additional or alternative training or fine tuning workflows, conditions or criteria may be used in different embodiments of the invention.

In some embodiments, training cycles may take place once in a given time period (such as, e.g., once a week) where the training dataset has changed, as may be reflected, e.g., in or calculated based on feedback scores or average or weighted scores for the N training items in the dataset. For example, some embodiments may establish a training dataset or pick/collect N highest scored data items for the training dataset, and calculate and average score for all N training items during a point in time P1 and a subsequent point in time P2 (e.g., one week/month after P1). If Average_score (N,P2)<Average_score (N,P1), some embodiments may perform a training or fine tuning cycle or a plurality of cycles. Otherwise, embodiments may not train or retrain the model based on the training set established in P2. Some embodiments may stop or not perform a training cycle, e.g., in a case where more inputs do not produce better results or produce worse or lower results or scores (which may, e.g., indicate an overfitting of the model).

Additional or alternative training or fine tuning workflows, conditions or criteria may be used in different embodiments of the invention.

A model or LLM may be trained or may be fine tuned using supervised learning techniques. The trained model may be validated and/or evaluated, e.g., using a separate dataset to ensure generalization, and using performance statistics or metrics such as for example root mean squared deviations (RMSDs), F1-scores, and the like. Some embodiments may include performing validation operations such as for example cross-validations to avoid overfitting, and/or continuously refining, updating, or retraining the model by iterating over online data collection, feature engineering, and the like.

A machine learning model according to some embodiments may constantly and/or continuously improve its ability to extract data from LLM outputs, e.g., by using techniques such as:

Peer review: the model may use and, e.g., consolidate the answers from other LLMs and/or "peer review" the answers from a given LLM, and may accordingly identify and correct errors and biases in a given LLM's outputs or answers. This may also be referred to herein as a consensus mechanism according to some embodiments.

Statistical analysis: the model may use or may include statistical operations and analyses, e.g., to score the LLMs on various parameters such as, e.g., accuracy, fluency, coherence, creativity, and the like (for example based on feedback scores or predicted scores or parameters). This information may be used to identify the most appropriate or reliable LLMs to use for a given type of task, prompt or query. For example, to kickstart the mapping algorithm (for example before data that may be used for training or fine tuning has been gathered or predicted, e.g., as explained herein), some embodiments may use external LLM benchmarks on different kinds of tasks (such as for example benchmarks or rankings based on coding tasks, or based on generating accurate text/content—as well as, e.g., industry or topic specific benchmarks, and more), and/or use manual assessments (e.g., by a subject matter expert or system administrator) for each generated block or task output. Embodiments may accordingly select or map questions or report generation tasks to LLMs external data, e.g., prior to self training or fine tuning. In some embodiments, this may include adding "bonuses" to a linear regression score (for example, in a case of a generation task related to a topic or keyword "finance", X points may be added to a score or feedback score or value of all LLMs known or documented as trained on finance or finance related data).

Reinforced learning: the model may use reinforced learning to learn from the feedback it receives from an expert network. This may help the model to learn which LLMs are most appropriate or reliable for different types of prompts or queries.

According to some embodiments, model operation and/or training process may include, e.g., the following example operations. The model may be given a set or a plurality of questions to answer (e.g., in the form of block and editorial parameters, see further description herein); the model may send or transmit each question to a plurality of LLMs; the model may receive the answers from LLMs and may refine them using its own custom transformers model; the model may rank the answers and/or corresponding LLMs, e.g., based on an expert network or consensus procedure (see further description herein); the model may take additional actions, such as, e.g., selecting the answer from the highest-ranked LLM; the selected answer may then be stored in a database, and/or may be sent or transmitted to a remote computer system and may, e.g., be displayed on a display or output device of that system; the model may receive a reward or penalty based on outcomes or outputs it may produce (for example: a user may rank or score an answer provided by the LLM); the model may repeat or perform additional operations, such as for example changing the weights or ranks assigned to different LLMs, e.g., until it has learned to perform the task effectively.

Some embodiments may include assigning one or more rankings to one or more generative models.

A reinforcement learning training, tuning, or retraining process, and/or training or tuning a machine learning model or LLM according to some embodiments may include or involve a plurality of operations, such as, e.g.:

Initializing the model with random weights. This may mean that the model has no prior knowledge about how to perform the relevant task, e.g., of extracting relevant data from text inputs.

Defining a reward function, which may be a function that maps the model's state and action and/or feedback received in response to an output generated by the model, to a reward value. The reward function may be used to train the model to take actions that lead to desired outcomes. For example, the reward function may reward the model for providing accurate or desirable answers to questions and/or for identifying and/or correcting errors in the answers generated by other LLMs or GenAI models.

Generating an episode, which may be or may include a sequence of interactions between the model and the environment. For example, an episode may start with the model being given a question to answer (e.g., in the form of a prompt including block and/or editorial parameters). The model may then send or transmit the question to a plurality of LLMs or GenAI models, receive their outputs or answers, and select and/or refine relevant answers to produce or generate a final answer or output to the question or input. The model may then be assigned a ranking or score, or receive a reward or penalty (e.g., from a user operating a remote computer) based on the outcome of its actions (e.g., a report produced and sent to the remote computer). For example, embodiments may send or transmit an answer or final output produced by the model to a remote computer, which may for example be operated by a user submitting or sending a question or prompt to be answered by the model and/or by the plurality of LLMs—and the user may label or assign a score or ranking for the answer (for example, a high score of 10 may be assigned to a "good" or accurate answer, and a low score of 1 may be assigned to an inaccurate, incomplete, or incomprehensible answer to a given question). The score may then be input into a reward or penalty function, which may be used to compute, change or update model parameters—for example by using scored answer or output as training data or items in a labeled dataset, where, e.g., scores/rewards may be used as labels for answers or output data items.

Updating the model's parameters and/or weights (including for example computing scores, ranks or weights for LLMs to which prompts may be sent), e.g., using an appropriate algorithm such as for example a policy gradient algorithm (e.g., the Proximal Policy Optimization (PPO) algorithm or protocol) to increase the probability of taking actions that lead to high rewards.

Various operations may be repeated, e.g., until the model has learned to perform the task effectively. The model may thus be able to provide accurate answers to users' questions and/or identify and correct errors in answers generated by other LLMs.

One nonlimiting example reward function may be defined as follows:

$$(eq.\ 1) \text{reward} = \text{accuracy} * (1 - \text{error})$$

Where accuracy may be the accuracy of the model's answer to the user's question, and error may be the error rate of the model's answer to the user's question. This example reward function may reward or reinforce the model for providing accurate answers to users' questions and/or may penalizes the model for providing inaccurate answers. In some embodiments an example reward function may include a feedback or predicted score such as, e.g.:

$$(eq.\ 2) \text{reward} = (\% \text{ of positive feedback among clients}) - \text{threshold}$$

Where some embodiments the feedback may a binary value, e.g., either positive or negative. For example in a case where 85% of the clients/users who used a given template or report provided a positive feedback, and 15% gave negative feedback (for example 85 votes of a binary value of +1 and 15 votes of a value or −1) and where a threshold value of, e.g., 70 is subtracted from the statistics or results then the net reward value may be, +15%. In a case where the percentage of positive feedback among users or clients is 65% then after subtracting the threshold value from the result the corresponding reward (or penalty) value may be −5%.

Additional or alternative reinforcement learning procedures scoring approaches and/or reward functions may be used in different embodiments, see also additional nonlimiting examples herein.

A machine learning or LLM according to some embodiments may rank outputs or answers received from other LLMs based on an "expert network" or consensus procedure. An expert network may refer to a set of models that have been ranked by the machine learning model or LLM, e.g., based on their reliability. An expert network or consensus process or procedure according to some embodiments may include processing and/or consolidating a plurality of outputs or data items received from a plurality of ranked LLMs.

Some embodiments may include selecting, by the trained machine learning model, one or more of the LLMs based on one or more of the assigned rankings, and sending an LLM prompt to one or more of the selected LLMs.

According to some embodiments, in order to query or prompt relevant LLMs or GenAI models, some embodiments may perform some or all of the following operations:

A machine learning model or LLM according to some embodiments may analyze a given input (such as for example a question in a form of block and/or editorial parameters) to identify or address key concepts, keywords and/or topics.

The model may check or look up scores or ranks assigned to or computed for the relevant LLMs on these topics, which may for example be stored in a dedicated database such as for example demonstrated with reference to some example data structures herein.

The model may select the LLM or GenAI models to which the highest score is assigned.

The model may send or transmit an LLM or GenAI prompt, and/or additional data items, to one or more of the selected LLMs or GenAI models (see nonlimiting example prompts herein).

Some embodiments may include or use a finite and consistent (e.g., does not change over time) list of possible values per feature or topic (for example, some embodiments may include a list of all industries, keywords or topics that may exist, or to which the model may be used to generate answers or reports based on input parameters) and/or ask one or more LLMs to assign a topic to the report or to the input parameters given the list and the parameters. For example an LLM or model according to some embodiments may assign a topic of "coding" to a report including input parameters such as, e.g., block parameters and editorial parameters including terms that the model may identify as relating to code generation (such as, e.g., "script", "command", and the like). Embodiments may then compare or create a training dataset and, e.g., use scores and/or linear regression methods for this specific feature or topic in order to monitor or assess the performance of different models or LLMs and improve overall performance for this specific topic-given, e.g., feedback or predicted scores for generated items or reports. In some embodiments, this may be achieved using one-hot encoding (in a case where 3 industries exists, an associated vector for a block may be either (1,0,0), (0,1,0) or (0, 0, 1) which may be used as an input to linear regression formulas or reward/penalty functions to evaluate a given model or LLM, e.g., together with corresponding scores and/or thresholds that may be used for evaluating, retraining, or fine tuning a given model (such as for example the model performing or executing the model or LLM mapping functionality).

The model may also address or consider other factors when selecting an LLM to prompt or query, such as, for example:

Accuracy: the model may prioritize LLMs that have a high accuracy or feedback/predicted score or rank for the topics relevant to the user's question (as may be indicated, e.g., using scores associated with data items or reports generated for the relevant topics or keywords by that model or LLM).

Cost: the model may consider a cost (e.g., according to a network load balancing approach or formula such as for example the weighted round robin (WRR) method) of querying each LLM.

Correctness of specific languages: the model may consider correctness or coherence score for each LLM output, e.g., for a specific language or programming language associated with a user's question.

Run time: the model may consider the LLM's run time, or how long it may take for the LLM to generate or provide an answer.

A nonlimiting example question which may be used as a prompt or may be included in a prompt according to some embodiments may be, e.g.: "what is the best way to develop a new AI model that can accurately diagnose cancer"? In some embodiments, this question may be split or parsed into a plurality of sub-questions, such as for example: What are the different types of cancer? What are the current methods for diagnosing cancer? What are the strengths and weaknesses of each of these methods? What are the most promising new approaches to cancer diagnosis? What are the challenges that need to be addressed in order to develop a more accurate AI-based cancer diagnosis model? and the like, for example using an appropriate parsing prompt (such as for example: "Given the complex question, "what is the best way to develop a new AI model that can accurately diagnose cancer?", split this into simpler, individual questions."). Each of the sub-questions may be sent, e.g., to a different LLM to get a variety of perspectives and insights. The model may then combine and/or refine answers from different LLMs to generate a more comprehensive and informative response to the original question.

In some embodiments, and in order to achieve further optimization, the model may, e.g., send the same query to multiple LLMs and combine the answers to get a more comprehensive and accurate response, and/or ask follow-up questions to relevant LLMs, e.g., to clarify or to further refine their answers.

A self-trained LLM for extracting reliable data according to some embodiments may be constructed, inter alia, by: 1) collecting data; 2) labeling the data to create a labeled dataset (which may include, e.g., determining if datapoints or outputs are "correct" or not as may be indicated, e.g., by feedbacks score provided to a given output or datapoint, where for example a score above a threshold value, e.g., of 80 may be considered "good" or "correct", and a score below that threshold may be considered "bad" or "incorrect"); and 3) training the LLM using the labeled dataset.

To collect data, some embodiments may include and/or use a dedicated platform where reports may be created. In some embodiments, a platform may be an online platform and may, e.g., be provided on a dedicated website. The platform may include a report editor where a client or user may select or choose a template (which may be or may include a list of blocks) and may insert or enter input parameters (such as for example which company or industry the report may be focused on). According to some embodiments, the platform may be cloud-based parallelized (such that, e.g., every step of the process may be handled by a separate server to improve temporal performance), and the platform may include a user interface (UI) created using an appropriate UI framework such as for example ReactJS. In some embodiments, a first server cluster may be used for handling web search tasks and a second, different server cluster may be used for handling LLM requests. Data such as, e.g., generated data items or reports, as well as training datasets may be stored, e.g., in a server such as for example a MongoDB server. Additional or alternative platform architectures and connectivities between system components may be used or included in different embodiments.

FIGS. 3A-B show example user interface components according to some embodiments of the invention.

Some embodiments may generate machine learning or GenAI prompts based on dedicated framework or approach using a plurality of parameters (such as for example block parameters and editorial parameters). In some example embodiments, an end user or client may use or operate a web-based platform or user interface to input a set of parameters such as, e.g., editorial parameters, into a template or report template, where the template includes and/or represents and/or is associated with additional parameters (such as, e.g., block parameters). A prompt may be generated, e.g., based on the plurality of block parameters and editorial parameters associated with a given block in a template or report template, and may be sent or transmitted to an LLM in order for an LLM output or response to be generated. Templates may be associated with keywords or parameters and outputs generated using a given template may be stored or documented in a dedicated database that may then be used, e.g., to train or fine tune a model or LLM according to some embodiments of the invention.

In some embodiments, a user interface (UI) or graphical user interface (GUI) may include a template or report template selection screen 302, which may allow, e.g., a user or client to choose a report templet associated with a specific topic or with specific contents and/or block parameters (such as a template of "startup analysis" which may be associated with the specific parameters or keywords such as, e.g., "startup", "technology", and the like, which may be associated with models that may be mapped for generating answers or output reports based on feedback scores or predicted scores, etc.), A user or client may add or input parameters such as, e.g., editorial parameters-into the platform, which may be done through a form interface 304 and/or a chatbot interface 306. A report template may include a plurality of blocks and a client or user may modify the contents or the blocks, remove blocks, add blocks, and the like, using a "building block" interface 308. A given block or the output received based on a prompt generated for a given template or block in a template may be presented on a graphical UI or interface 310, where, e.g., a user or client may score or provide feedback for the generated block or output. Block parameters may for example be redefined or altered (e.g., by a client or user) in screen or interface 312. Additional or alternative UI components or elements may be used in different embodiments of the invention.

In some example embodiments, to create a report, a user operating a computer system may load and/or edit a report template which may be stored and/or provided by the platform. A template may be or may include a set or replicable list of blocks that may be used as elementary bricks to build generated reports according to some embodiments. One block may be or may represent, or may be used to generate, e.g., a graph or specific section of a report.

Figure 4:
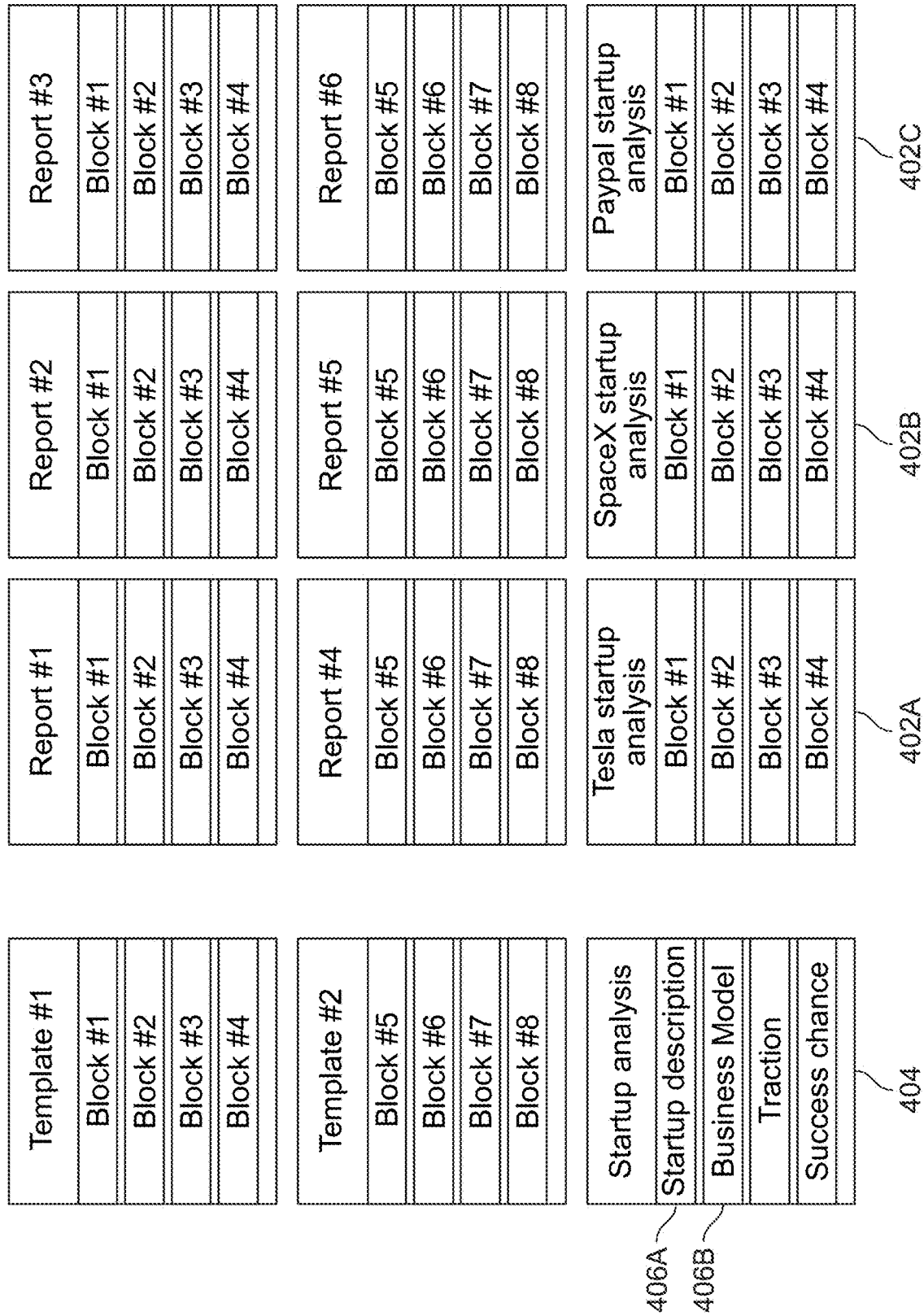
FIG. 4 shows example templates and reports according to some embodiments of the invention.

FIG. 4 shows example templates and reports according to some embodiments of the invention.

For example, templates 1 and 2 may include blocks 1 to 4, and 5 to 8, respectively. Each template may be used to build a report, which may include, for example, information and/or data on any given topic (such as for example a company, product, industry, market, facility . . . ). For example, reports 402A-C may be built using template 404, which includes different blocks, each describing information relating to startup company analysis. For example, block 406A may include information corresponding to a short description of the relevant startup company, block 406B may include information corresponding to the business model of the company, and the like.

In some embodiments, the LLM prompt comprises two or more sets of input parameters in a text format.

For example, in some embodiments, a block (e.g., in a report template) may include or may be associated with a set or group of, or with plurality of block parameters. For example, block parameters may include commands or instructions which may be sent to multiple LLMs to generate the a "final output" that may be included in a given report. In addition to block parameters, some embodiments may receive a plurality of, or a set or group of editorial parameters, which may include various inputs relating to the content of a specific report, e.g. for example, a name of a company, a question of interest, and the like, which are to be described in the report. Some embodiments may provide block parameters and editorial parameters (e.g., in text or JavaScript object notation (JSON) format) as inputs (which may for example be included in an LLM or GenAI prompt) to a plurality of machine learning models or LLMs, to generate an output for each block of a given template, which may be presented in a report. According to some embodiments, prompts may be or may include questions which may include or be based on various parameters, such as for example block parameters and editorial parameters.

FIG. 5 shows example block parameters, editorial parameters, and output block according to some embodiments of the invention.

In some embodiments, the LLM prompt comprises two or more sets of input parameters in a text format.

According to some embodiments, a template for a report may be or may include a list or a plurality of blocks (and, e.g., corresponding block parameters for each block) and a list of input (e.g., editorial) parameters for each block (which may, e.g., be added to the block by a client or user). Each block in the template may be converted, coded or included in an LLM prompt, e.g., in a JSON structure with a plurality of keys, which may include, e.g.: a block prompt 502 and specifications of the block's desired output. In the specific nonlimiting example shown in FIG. 5, example editorial parameters 504 may include, e.g., a company name, language, and the like, and example block parameters 506 may include, e.g., keywords such as, e.g., "business model", "traction", and the like.

A nonlimiting example a block prompt may be an LLM prompt including relevant block parameters or keywords, such as, e.g., "perform a N-sentence startup analysis on company X, where the analysis considered latest technology developed during the last M-years by the company and consider performance reports from the last Y quarters", where N and M may be example block parameters defined by, e.g., a system administrator when creating the template, and X and Y may be example editorial parameter provided based on a client's or user's input to the template), and a specification of a desired output format (for example, "output the generated result as a JSON including these specific keys that we define and then parse the output", which may also be considered, e.g., as a block parameter). For example, an LLM prompt according to some embodiments may include a set of input block parameters (such as, e.g., M and N) and a set of input editorial parameters (such as, e.g., X and Y), and the two sets of parameters may thus be input to an LLM as part of an LLM prompt to generate output data items or reports.

Additional or alternative data or prompt structures may be included and used in different embodiments of the invention.

Figure 7:
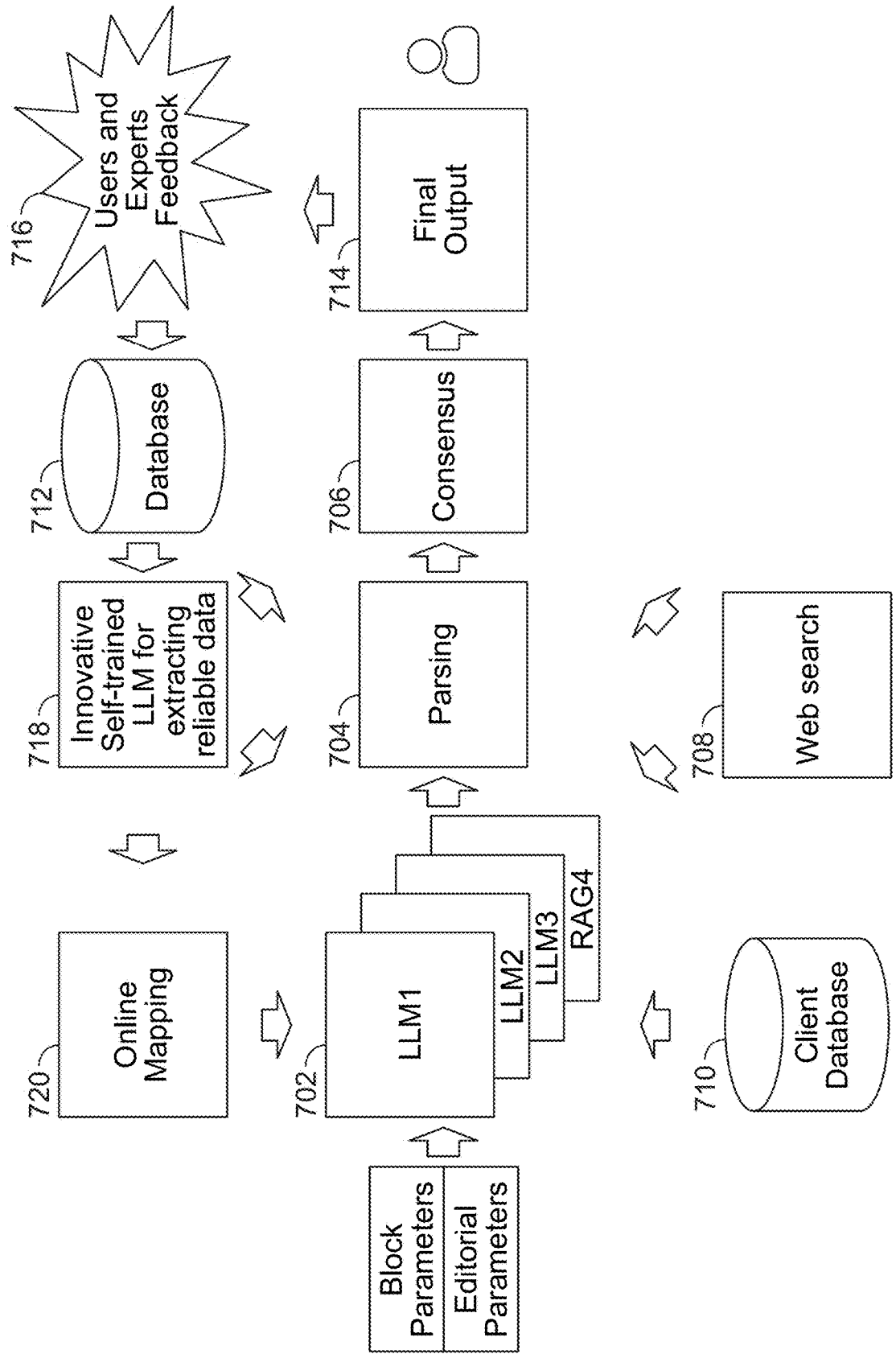
FIG. 7 is a block diagram of an example system for extracting data from large language model outputs according to some embodiments of the invention.

FIG. 6 shows some example data structures that may be used in some embodiments of the invention. An example block JSON file or data structure where the block parameters are created and/or stored is provided in element 602. An example file or data structure including both block parameters and editorial parameters may be created and stored, e.g., as a MongoDB object such as, e.g., element 604. Block parameters and editorial parameters may be substituted/plugged by some embodiments into a predefined prompt, such as, e.g., illustrated in element 606, which may then be sent to relevant LLMs to produce or generate structured outputs (that may, e.g., later be parsed or handled in a manner agnostic to the specific LLM used). LLM outputs such as, e.g., answers or parsed answers from each LLM may be fed into a consensus algorithm or mechanism using, e.g., a consensus prompt 608, and a final output may then be provided or presented on a graphical user interface, e.g., in an online platform. Here is one consensus version FIG. 7 is a block diagram of an example system for extracting data from large language model outputs according to some embodiments of the invention.

Some embodiments may include or use a standardized format for data items input into a machine learning model or LLM which may be used to allow extracting data or information from a plurality of LLM generated data items according to some embodiments of the invention.

Some embodiments of the invention may include a machine learning or LLM module 702, which may, e.g., generate or construct LLM prompts based on block and/or editorial parameters and/or desired output specifications or format, and/or perform additional or alternative operations such as for example described herein. In some embodiments, the LLM module may send or transmit a generated prompt to a plurality of LLMs for example to generate response to an input LLM prompt including the relevant parameters.

A nonlimiting block prompt which may be generated by some embodiments of the invention may be, e.g.: "You are a Mckinsey senior analyst. You write a report with these ({editorial parameters}). You are asked to write a block with these ({block parameters}). Here is ({data}) to base your analysis on". Example parameters used as part of this example prompt may be or may include, for example:

Editorial parameters, which may be or may include, e.g., user or client inputs describing topics and/or contents to be described in the report.

Block parameters: which may be or may include pre-set, predefined, and/or automatically generated LLM commands or instructions, which may, in some embodiments, be extracted from a library, list, or dataset of block parameters. In some embodiments, block parameters may be generated for and/or associated with templates or reports.

Example data or information sources may include, e.g.:

Manual inputs: for example, a user may manually add any data to any block, and/or may add or remove blocks in order for the data to be considered by the relevant LLM or LLMs.

LLM knowledge: LLMs are powerful sources of information which include data and/or information using on which a relevant LLM is trained. Some embodiments may include an LLM trained using a plurality of blocks and/or reports as training data, which may itself serve as a source of data and/or information based on which future blocks and/or reports may be generated.

Automated web search: some embodiments may be integrated with, interface with or otherwise access a web search engine (such as for example the Google engine) and may, e.g., scrape or collect content or results associated with keywords provided in the prompt.

Client database: some embodiments may include a Retrieval-Augmented Generation (RAG) process to collect knowledge from client databases.

Some embodiments of the invention may include a smart parsing module or component 704 which may allow, e.g., sending prompts and receiving responses from various LLMs in a structured formatted.

For example, for the example prompt of: "You are a Mckinsey senior analyst. You write a report with these ({editorial parameters}). You are asked to write a block with these ({block parameters}). Here is ({data}) to base your analysis on. Output the answer as a python dictionary with fixed keys.", a nonlimiting example parsing prompt may be, e.g.: "Only and directly output the python dictionary from this text, remove the rest of the comments and make sure it is parsable with the AST (abstract syntax trees) python library."

In some embodiments, parsing prompts may be sent to each individual after providing outputs or answers, e.g., to make sure the object can be read as code in a JSON structure. In some embodiments a parsing prompt may be used for remove unnecessary words or strings from the LLM's pre-parsed or initially provided answer or response.

Figure 8:
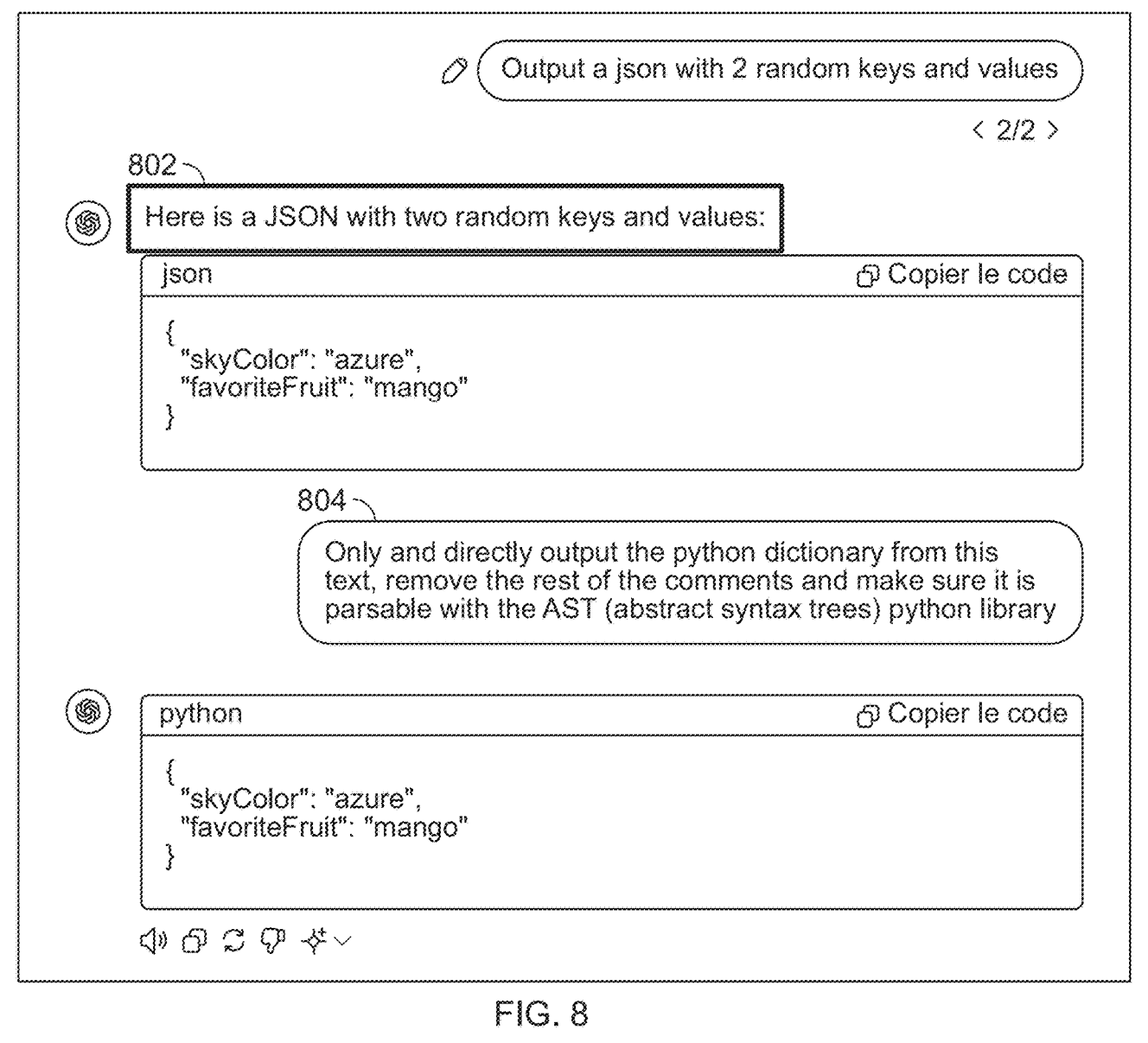

FIG. 8 shows an example use of a parsing prompt according to some embodiments of the invention.

According to some embodiments, an LLM may provide an output to a request or question (which may be for example provided as part of an input prompt to an LLM based on block and/or editorial parameters) which includes unnecessary or irrelevant parts or segments, such as, e.g., element 802, or comments such as "here is the output you requested"-which should not, in themselves, be included in, e.g., a python code segment or JSON file (since, e.g., these parts may trigger runtime errors). Some embodiments may use a parsing prompt 804 to omit or remove undesirable parts of an LLM output, for example to process or refine the output according to a desired format or form (such as, e.g., a format which may be readily inserted into a python code segment or program without evoking runtime errors, etc.).

According to some embodiments, a parsing prompt may ensure that LLM responses or answers may be agnostically parsed or formatted—e.g., regardless of the specific LLM providing or outputting the answer or response.

In some embodiments, a machine learning model or LLM may split or parse a user's question into multiple sub-questions, such as for example using a vector embedding or embedding representation such as for example demonstrated herein and/or based on semantic parsing procedure and/or additional or alternative natural language processing (NLP) techniques. Additional or alternative parsing prompts and operations may be used in different embodiments.

Some embodiments may include a consensus or "peer review" mechanism, module, or component 706 that may for example process or merge a plurality of data items, answers, or responses from a plurality of LLMs into a refined answer or response. Refined answers or response may be used or included in blocks and/or reports produced or provided by some embodiments.

Various final outputs, refined answers or responses to LLM or GenAI prompts may be generated or used according to different embodiments. In one nonlimiting example, a final output or refined response would aggregate, collect, or include all response, outputs, or data items received from the plurality of LLMs or GenAI models in a single file, document, or data item.

FIG. 9A-B shows example outputs by a plurality of large language models and an example final output produced according to some embodiments of the invention.

Elements 902A-D show example outputs provided by four example LLMs to an example prompt such as, e.g., "evaluate the total market size for the artificial intelligence (AI) industry, provide results for the years 2020, 2023, 2026 that may be plotted as a graph, provide references to resources used in providing results". Each output of 902A-D may include the corresponding output data or text 904 by the relevant LLM, as well as the resources (e.g., websites, online databases, and the like) used for producing the results. Some embodiments may further process each output and add, e.g., rank and grade fields 906 which may designate a scoring, ranking or grading of a given model with regard to keywords or topics (such as "market analysis", "market", "AI", and the like) included in or associated with the LLM prompt input to the LLMs, and/or a general rank with regard to all outputs or reports produced by the model (which may be calculated, e.g., using average feedback or predicted scores) and/or with past outputs generated using the relevant LLM. 902A-D may be input into additional model or LLM (such as, e.g., an LLM different from the 4 LLMs used for generating 902A-D) which may be a self-trained model or LLM, and an example final output 908 may be generated or provided (e.g., using a consensus or peer review procedure or mechanism) as single output or block integrating individual outputs 902A-D. Additional or alternative output formats and generation mechanisms may be used in different embodiments.

In another nonlimiting example, a refined response or final output to an LLM or GenAI prompt may include output data that all LLMs "agree" on, or data or information included in all outputs or responses received from a plurality of LLMs to which prompts were sent or input. Additional or alternative consensus logic and/or conditions and/or criteria may be included in different embodiments.

Some embodiments may include outputting, by the trained machine learning model, a refined response to the LLM prompt, the outputting of a refined response based on one or more responses to the LLM prompt by one or more of the LLMs. In some embodiments, the outputting of a refined response comprises omitting contents from the refined response, wherein the omitted contents are not included in one or more of the responses by one or more of the LLMs.

A nonlimiting example consensus prompt according to some embodiments may be, e.g.: "from this list of inputs from different LLMs answering the same question, output exactly one python parsable with a smartly merged consensus answer (or final output/refined response) that has exactly the same format and number of variables as each one of the answers. In order to build this smartly merged consensus answer: 1) extract the important data from each input (or response); 2) if different inputs include similar text: summarize, aggregate and create new sentences from this data; 2bis) if inputs include datasets or tables: pick the right rows from each dataset or table and create a reconcile the dataset based on the inputs; 3) remove irrelevant, useless, general, or uninformative data; 3bis) if two or less inputs (or responses) include information or contents that are not included in additional, three or more inputs (or responses), then omit/exclude this information or these contents from the output or refined response; and 4) make sure you follow the same output format and include every key and every value in the various inputs."

Some embodiments may include executing a web search query, the query generated using one or more of the input parameters. In some embodiments, the refined response comprises one or more results to the executed query.

For example, some embodiments may include a web search module 708 that may, e.g., add content scrapped from a web search, for example using a search engine and corresponding web search queries. Scraped data may for example be added to the initial prompt, to the LLM answer, to inputs to the consensus mechanism, and to a consensus or refined answer, e.g., to generate a final output, block, or report. A nonlimiting example web search prompt according to some embodiments may be, e.g.: "output and execute 3 search queries and 3 results to each executed query using search engine X to get content about these ({input block parameters}), to be included in a report on these (input editorial parameters)." Based on a web search prompt, a web search module according to some embodiments may execute queries output from the LLM and, for example: 1) collect 3 search keywords and discover or search content about the relevant topic or question, e.g., by inputting the keywords into a search engine; 2) scrape 3 top search results, e.g., to each of the keywords or search terms; and 3) summarize and/or aggregate the scraped search results into a single final output or refined response.

FIG. 10 shows an example web search process according to some embodiments of the invention.

Some embodiments may perform a web search based on block and/or editorial parameters, e.g., as provided in a web search prompt 1002. For example, a search prompt may be, e.g., "output top 3 results to search queries using search engine X to fetch content about topic Y that can be used in writing a report describing Z", where X and Y may be or may include block parameters and where Z may be or may include editorial parameters. Some embodiments may automatically extract data and/or information from a web page, for example using web scraping tools such as, e.g., Selenium and python libraries to scrape the content of a webpage or link and/or Googlesearch-python to scrape google link URLs. Additional web search prompts and/or web scraping techniques may be used in different embodiments.

A data retrieval module may be used to provide access to external databases (such as for example database elements 710 and/or 712), for example, using appropriate application programming interfaces (APIs) for relevant databases. In some embodiments, embeddings or numeric/vectoral representations may be calculated or created, e.g., for each document or data point in a relevant dataset. A data query according to some embodiments may also be represented using an embedding and be used to retrieve relevant documents from the dataset. Retrieved documents may be summarized and/or provided as input to LLMs and/or to different operations described herein.

Some embodiments of the invention may retrieve data items or elements from an external database or a client database (which may be, e.g., a database stored in the systems or a user or client inputting editorial parameters and/or using templates to generate reports according to some embodiments of the invention), using retrieval augmented generation, which may include, for example:

An example model may access and ingest the external database's files, documentation, and/or metadata into a separate database (such as for example a cloud database). Documentation may include, for example, product manuals, troubleshooting guides, previous support tickets, and internal training materials.

Each document or file in the database or knowledge base may be processed using an embedding model, such as, e.g., Sentence-BERT or OpenAI's GPT models. An embedding or numeric representation may be created for each document or file to capture the document's semantic content.

Embeddings may be stored in a database such as for example in a Pinecone vector, or a database optimized for fast similarity searches, which may allow the system to quickly retrieve relevant embeddings/documents based on appropriate queries.

A prompt or query may be created, such as, e.g., "Find the revenue of company X in 2024" may be received, and the system may process the query to generate an embedding using the same model that was used for the documents.

The embedding for the query or prompt may then be compared to document embeddings stored in the vector database. Using a similarity or relevance metric (such as, e.g., a cosine similarity, e.g., $\text{cosine\_similarity} = (A \cdot B)/(\|A\| * \|B\|)$, where A and B are vectors or embeddings, $A \cdot B$ is the dot product of A and B, and $\|A\|$ and $\|B\|$ are the magnitudes or norms of A and B, respectively), the system may identify and retrieve the documents that are most relevant or similar to the prompt or query (e.g., the documents for which the highest cosine similarity scores were calculated).

The retrieved documents may be provided as context or auxiliary information to a model or LLM to generate a detailed and/or context-aware response based on, e.g., data or information sources such as, e.g., web search, internal LLM knowledge (based on training sets used for training or fine tuning the LLM), and context or auxiliary information from the external database(s). In one example scenario, where a user inputs a prompt of "help me reset the password to my work email", context information such as documents from a client database may allow a given model or LLM to output specific instructions accounting for the specific email platform or service used in the user's system, which may be used for example in addition to information included in the training dataset used for training a given LLM. Additional or alternative examples may be realized.

The LLM-generated response may be integrated into a block prompt. The response may be both accurate and contextually relevant, thanks to the retrieval augmented generation process utilizing an external database as an auxiliary or contextual source of information.

The system may be designed to learn from user interactions. For example, if recurring or similar prompts are input to the system (e.g., repeatedly asking to find revenue statistics of different companies), the system may fine-tune its embeddings and embedding generation component (e.g., according to feedback scores or predicted scores associated with specific parameters or keywords, or using additional or alternative improvement, retraining, or fine tuning procedures), as well as retrieval process or mechanism, e.g., to prioritize documents related to that topic and to improve future responses.

Additional or alternative data or information retrieval mechanisms or procedures may be used in different embodiments.

Some embodiments may provide a final output 714 which may be a refined or aggregated response produced by an LLM based on a plurality of answers or responses to questions or inputs produced by a plurality of LLMs. In some embodiments, the final output may include web search results and/or information retrieved or fetched from external databases. Additional or alternative contexts may be included in final outputs according to different embodiments of the invention.

Some embodiments may include training the machine learning model using one or more past refined responses generated by the model. In some embodiments, the training of a machine learning model is performed using one or more metrics assigned to one or more data items.

For example, scores or feedback may be provided (element 716) on any block of any report created or generated. In some embodiments, past refined responses or final outputs generated by a model or LLM using, e.g., a consensus mechanism, as well as feedback regarding final outputs/blocks/reports (such as, e.g., scores or metrics), may be stored in a dedicated database (such as, e.g., element 712) and allow to train or tuning a machine learning model or LLM (element 718) such as, e.g., the model or LLM used for executing the consensus mechanism and generating a final output or refined response, and/or for refining or improving the model mapping mechanism and/or perform additional operations such as for example described herein. In this context, past refined responses or final outputs may refer to model outputs such as, e.g., blocks and/or reports generated prior to a specific generation task or to the receipt of parameters based on which a prompt may be generated and sent to different LLMs according to mapping mechanism—that may be stored or included in a labeled dataset (including, e.g., feedback scores) such as, e.g., described herein.

For example, a mapping process or algorithm which may be performed by an online mapping module or component 720 according to some embodiments may include or may consider, e.g., the following example parameters (see also nonlimiting example datasets and data structures provided herein):

Template (e.g., identifying optimal LLMs for a given template).

Block (e.g., determining optimal LLMs for specific block parameters).

Knowledge domain (e.g., assessing which LLM is most suitable for a topic or knowledge domain).

Location (e.g., evaluating which LLM performs well in reports concerning companies in specific geographic regions, such as, e.g., in China).

Language (e.g., identifying optimal LLMs for reports written in different languages, such as, e.g., reports generated in Chinese).

Consensus function or algorithm (e.g., deciding which LLM performs well for a given consensus function or mechanism).

A mapping process or algorithm according to some embodiments may ensure, e.g., that the quality of the data collected from LLMs is of a desirable level of quality.

A mapping process or algorithm may be an "online" process, which may, e.g., automatically trained on the newest data and may forget or not consider historical data or performance.

Some embodiments may select a plurality of LLMs to send a prompt to (where a prompt may for example be generated for each block). In some embodiments, a mapping mechanism or algorithm may be used for selecting LLMs that are appropriate or suitable for each block or prompt or for providing responses or answers to a given prompt (which may represent a block in a template or report).

A nonlimiting example labeled dataset according to some embodiments may be, e.g.:

TABLE 1

| | Template | Block | Industry | Location | Language | Consensus | Feedback | LLM Used |
|---|---|---|---|---|---|---|---|---|
| Block_1 | x | x | x | x | x | x | 100% | Mistral, Cohere, ChatGPT |
| Block_2 | x | x | x | x | x | x | 50% | Perplexity |
| Block_3 | x | | | x | x | x | 70% | Llama |
| Block_4 | x | x | x | x | x | x | 0% | Llama, Mistral, Cohere, ChatGPT |

FIG. 11 shows an example database which may be used in model training and/or mapping according to some embodiments of the invention.

In some embodiments, one or more of the past refined responses are associated with one or more of the input parameters of the two or more sets of input parameters In some embodiments, upon generating an output such as, e.g., blocks and/or reports, each output, block, or report may be documented in a database or data structure 1100, which may include various fields, e.g., for each generated output or block, the various keywords and/or parameters (including for example block and editorial parameters) as well as the specific LLM(s) used for generating a specific output. For example, a database entry for a given output may include or specify an identifier 1102 for the output, a template used for generating the output 1104, a specific block within the template for which the output was generated 1106, keywords or terms such as the industry with which the output may be associated 1108 (which may, e.g., be extracted from a prompt or a template), a location from which a prompt was sent to generate the output 1110, a language of the prompt and/or output 1112, a consensus function or mechanism used for consolidating different LLM outputs to produce a final output 1114, a feedback score provided for the output 1116, and an LLM or LLMs used or prompted as part of generating the output 1118. The dataset may be filtered or screened, for example to fetch only data where a given LLM was used, and some embodiments may compute or predict feedback scores or rankings for outputs which were not scored, e.g., based on existing rankings. In some embodiments different fields or features may be encoded into a number (such as for example English=1, French=2) or be one hot encoded or embedded, and may for example be input into a regression formula to calculate scores and/or rewards and/or penalties for as part of model training, self training, or fine tuning which may be used to improve LLM or model mapping and/or the consensus mechanism according to different embodiments. The database may be filtered according to various conditions or criteria, and a given model or LLM may be trained using the filtered dataset to improve performance (as may be measured or documented using feedback scores for output items or reports).

In some embodiments, a regression model may be used to assign a score to each LLM depending on the dimension or parameters values. Some embodiments may filter out LLM associated with low scores, and/or send prompts to LLMs associated with high scores.

In some embodiments, one or more of the data items are associated with one or more of the input parameters of the two or more sets of input parameters, and/or one or more of the past refined responses are associated with one or more of the input parameters of the two or more sets of input parameters.

For example, labeled datasets and data items (such as for example past final outputs or refined responses produced or generated by the model or LLM according to a consensus and/or mapping mechanism such as, e.g., illustrated herein with regard to elements 1100 and 1300) for model training according to some embodiments may be associated with specific input parameters (e.g., block parameters, topics, and the like) and a given model or LLM may be trained to produce refined responses or outputs for these specific parameters. According to some embodiments, a labeled dataset may be created or constructed for each keyword, block, template, and the like. Labeled datasets may be used for training a dedicated machine learning model or LLM. This LLM may be used in various ways, including, e.g., as any other LLM which may provide responses that may, e.g., be input to the consensus and/or mapping mechanism.

In some embodiments, the dedicated machine learning model or LLM may be used for generating text or code. Generating code may allow, for example, for dynamically generating frontend code from a given prompt.

Figure 12:
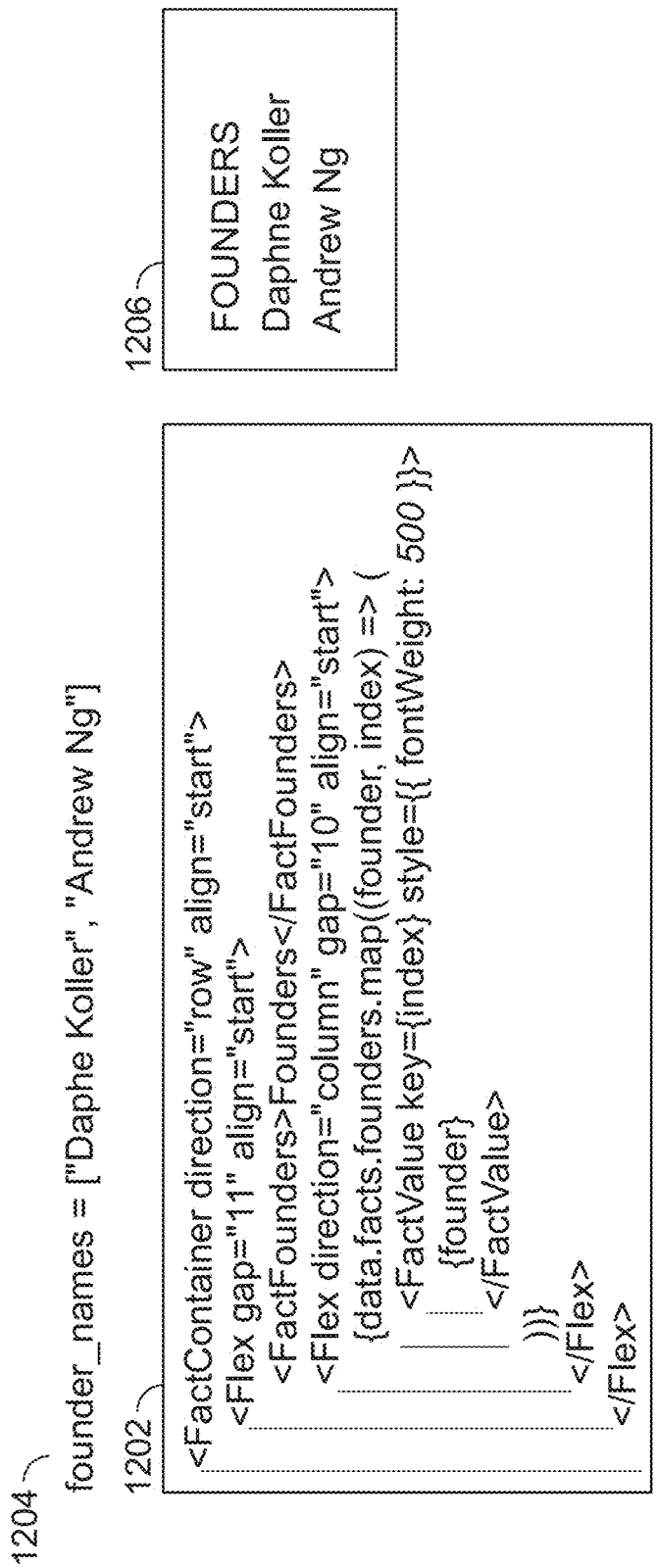
FIG. 12 shows an example code generation process according to some embodiments of the invention.

FIG. 12 shows an example code generation process according to some embodiments of the invention.

Some embodiments may include automatically executing an output code, the output code included in the refined response.

For example, based on an appropriate prompt (such as for example "generate code for a graphical element in webpage using programming language [X] presenting names of founders provided in {founder_names=["Daphe Koller", "Andrew Ng"]}, where items within curly brackets may be, e.g., editorial parameters input by a user, and where items within square brackets may be, e.g., block parameters specified in a given report template by a system administrator) some embodiments may generate a response, final output, or refined response including output a computer program, instructions, or code 1202 based on input parameters 1204. Some embodiments may automatically execute the output program, instructions, or code 1202, such that, e.g., the relevant graphical element may be constructed and/or embedded in a webpage 1206. Some additional examples may include specifying graphical properties such as, e.g., font size and coloring parameters as block and/or editorial parameters. Upon code generation, some embodiments may test or verify the code's validity and compatibility with a given execution environment (which may be, e.g., specified by the user or client as editorial parameters). This may be done, for example, by the server or cloud platform running or executing some of the plurality of modules described herein. If the code passes these tests or checks, the system, server or platform may proceed to execute the code, which may produce a desired output or action as may be specified by the relevant LLM prompt (such as for example in a case where the result of a computation was requested in a prompt). The result may then be sent or transmitted back to the user or client over a data or communication network and through the platform or UI. In other examples, the generated code or output code may be sent or transmitted to a user/client device or computer system (e.g., in a text or JSON file, or in an executable file), and may be executed on that device or system. In addition to the nonlimiting use case of automatically building a website or graphical objects in a website, another nonlimiting example use case for code generated by models or LLMs according to some embodiments may include performing automated data analysis—where a user may, e.g., input a prompt or query such as "generate code in programming language [X] to analyze the historical weather database [Y] to identify long-term trends in temperature and precipitation patterns over the past 50 years. Analysis should include calculating average yearly temperatures, detecting anomalies, and creating visualizations showing the correlation between CO2 levels and temperature changes.", and where the model may, e.g., output code instructions or commands (e.g., using the relevant programming language such as, e.g., python libraries, or using the R data analysis software package) to extract, process, visualize, and summarize the relevant data. Additional or alternative code generation processes and use cases may be used in different embodiments.

In some embodiments, the training of a machine learning model is performed using one or more metrics assigned to one or more data items.

FIG. 13 shows an example dataset of prompts and corresponding outputs and feedback scores according to some embodiments of the invention.

Some embodiments may include training the machine learning model using one or more past refined responses generated by the model.

For example, a self-trained machine learning model or LLM for extracting data from a plurality of LLMs may be trained, e.g., using a nonlimiting example labeled dataset 1300 and/or a dataset e.g. of the form:

TABLE 2

| | Prompt | Final Output | Feedback Score |
|---|---|---|---|
| Block 1 | Same prompt with different parameters | Same structure with different content | 100% |
| Block 2 | Same prompt with different parameters | Same structure with different content | 50% |
| Block 3 | Same prompt with different parameters | Same structure with different content | 70% |
| Block 4 | Same prompt with different parameters | Same structure with different content | 0% |

Some embodiments may train or fine-tune a machine learning model or LLM using, e.g., a labeled dataset such as for example dataset 1300 or a combination of datasets or data structures 1300 and 1100 (which may include past refined responses or final outputs produced using a consensus mechanism and scored or labeled using feedback scores) and/or using reinforcement learning procedures and/or functions. For example, some embodiments may combine a loss function (such as, e.g., cross-entropy loss) with a feedback score/metric, loss factor, or function (such as, e.g., mean squared error of scores or metrics for a given block or template) in order to train a machine learning model or LLM using LLM outputs and feedback scores or metrics. In some embodiments, the trained model or LLM may replace or be used without reference to different LLMs previously used in model mapping. For example, once a comprehensive dataset if generated which may include, e.g., hundreds of thousands or millions of highly scored output data items (such as for example output blocks and/or reports), or of output items for which high feedback scores were provided (e.g., higher than a threshold, e.g., of 90%, or based on additional or alternative conditions or criteria)—some embodiments may use these output items as a training dataset to train an LLM (which may be a separate LLM not used for generating the output items used for training). Some embodiments may then use the LLM trained using highly scored output items to generate future output items instead of the LLMs and/or the model mapping mechanism used for generating items included in the training set. A training set including highly scored output items may, e.g., be of a form or format similar, e.g., to database 1300, although additional or alternative forms or formats may be used in different embodiments.

In some embodiments, a model training process may combine two types of loss functions, such as for example:

Language modeling loss (which may be a cross-entropy loss): this may be, e.g., a standard loss function for LLMs, which may measure how well the model predicts the next word in the sequence given the previous words. It may be used for the model to generate coherent and contextually appropriate outputs.

Feedback score loss (which may be a mean squared error loss): this may be computed based on the difference between a model's output and an expected output, which may be weighted by a feedback score for the model's output. Higher feedback scores may indicat better alignment with the user's expectations, so the model may accordingly learn to produce outputs that are more likely to receive high scores.

A model or LLM according to some embodiments may be trained iteratively using a combined loss function or multiple functions, and may accordingly generate outputs that not only are contextually relevant (through, e.g., cross-entropy loss) but also align well with user feedback (through, e.g., feedback score loss). For example, given a dataset of output items where:

Output items associated with the keyword or input parameter "Tesla" were provided 100% feedback scores, or have an average feedback score of 100%, or have 100% positive feedback scores (e.g., all scores provided to the relevant output items may be above zero): based on relevant loss functions, the model may learn that outputs for this keyword or parameter closely matches user expectations, so similar outputs may be generated for future prompts including this keyword or parameter.

Output items associated with the keyword or input parameter "SpaceX" have an average feedback score or 50% or have 50% positive feedback scores: based on relevant loss functions, the model may learn that outputs for this keyword or parameter only partially aligns with user expectations, leading to adjustments/improvements in future outputs based on, e.g., fine tuning.

Output items associated with the keyword or input parameter "Neuralink" have an average feedback score of 0%, or have 0% positive feedback scores: based on relevant loss functions, the model may learn that outputs for this keyword or parameter may be far from user expectations, prompting significant adjustments in generating future outputs (e.g., based on fine tuning).

Such a combined example approach, using both language modeling techniques and feedback-based refinement, may allow for the development of a model that is not only fluent and coherent but also aligned with specific user expectations, leading to optimized task-specific performance.

A dedicated machine learning model or LLM may be self-trained, e.g., as it may be introduced or included as among the LLMs used for generating responses or answers while learning from, or continuously being trained using outputs from other LLMs and/or using feedback scores or metrics.

A model or LLM according to some embodiments— which may be for example the model used for executing the consensus mechanism and producing final/consolidated responses or outputs, or another, different and/or separate model—may be trained using a comprehensive dataset or datasets such as for example provided herein, and once the model has been trained or fine tuned to a satisfactory level (for example, in a cases where further training cycles or episodes no longer improve the model's performance, as may be indicated by comparing feedback/predicted scores or average scores provided for generated data items or outputs before and after a training cycle)—it may for example be used exclusively and independently from, e.g., models or LLMs used for generating responses or outputs for prompts according to a model mapping mechanism or procedure. Once trained, e.g., using final output data consolidated or produced by a plurality of LLMs using a consensus and/or model mapping mechanisms—an LLM trained on a comprehensive dataset of final outputs may perform better, or may generate outputs or responses of higher quality, compared to final outputs provided using the consensus and/or mapping mechanisms. Such a model trained using final outputs may thus replace other LLMs or models once trained to a satisfactory level, for example such that the mapping and/or consensus mechanisms may no longer be needed and may be omitted from output generation processes according to some embodiments of the invention.

Some embodiments of the invention may improve machine learning and GenAI technology by ensuring the quality, accuracy and consistency of generated content. Some embodiments may act as an intelligent quality control layer, filtering and validating the information produced by various generative models, thereby reducing errors and biases. Embodiments may thus lead to higher trust in artificial intelligence or LLM-generated data, enabling more reliable training datasets, better model performance, and more dependable applications in critical fields such as for example healthcare, finance, and legal services. In addition, some embodiments may improve machine learning technology by enabling continuous self-improvement and adaptation to new data without requiring extensive manual intervention for model tuning or retraining. Embodiments of the invention may therefore automatically adapt to emerging trends and evolving language patterns, making it more responsive and relevant in dynamic environments. Some embodiments may improve generative artificial intelligence or LLM technology by providing a standardized framework for generating prompts and/or output data items, and for storing these prompts and items, to generate datasets (which may be labeled or scored) that may be used for training LLMs and may allow for self training or fine tuning with reference to specific keywords, parameters, and the like. Some embodiments may provide an innovative self trained LLM which may be trained or fine tuned using, e.g., final outputs produced by the model itself and using a reinforcement learning approach, and may, once trained, offer superior performance compared to models used as part of generating the outputs which were used to train the self trained model.

Figure 14:
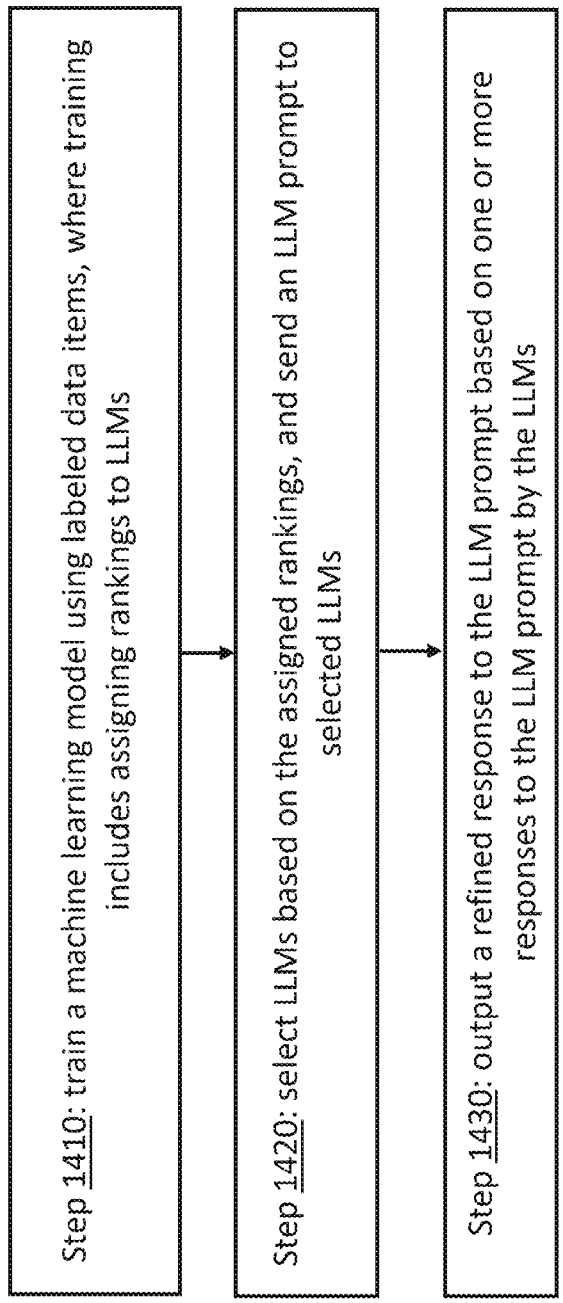
FIG. 14 is a flow diagram of an example method for extracting data from large language model (LLM) outputs according to some embodiments of the invention.

FIG. 14 is a flow diagram of an example method for extracting data from large language model (LLM) outputs according to some embodiments of the invention. In operation 1410, a machine learning model may be trained using labeled data items, where the training may include assigning or computing rankings to one or more LLMs (e.g., using a reinforcement learning approach and/or user feedback and/or reward or penalty functions). Some embodiments may select, by the trained machine learning model, one or more of the LLMs based on the assigned or computed rankings, and send an LLM prompt (e.g., requesting outputs, responses or answers to a question, problem, query, and the like) to one or more of the selected LLMs (operation 1420). Some embodiments may output, by the trained machine learning model, a refined response to the LLM prompt based on one or more responses to the LLM prompt by one or more of the LLMs (which may, for example, aggregate different responses by different LLMs into a single output response or file and/or omit or edit contents of some responses by the LLMs, e.g., based on different conditions or criteria; step 1430). Additional or alternative operations may be included in different embodiments.

One skilled in the art will realize the invention may be embodied in other specific forms without departing from the spirit or essential characteristics thereof. The embodiments described herein are therefore to be considered in all respects illustrative rather than limiting. In detailed description, numerous specific details are set forth in order to provide an understanding of the invention. However, it will be understood by those skilled in the art that the invention can be practiced without these specific details. In other instances, well-known methods, procedures, and components, modules, units and/or circuits have not been described in detail so as not to obscure the invention.

Embodiments may include different combinations of features noted in the described embodiments, and features or elements described with respect to one embodiment or flowchart can be combined with or used with features or elements described with respect to other embodiments.

Although embodiments of the invention are not limited in this regard, discussions utilizing terms such as, for example, "processing," "computing," "calculating," "determining," "establishing", "analyzing", "checking", or the like, can refer to operation(s) and/or process(es) of a computer, or other electronic computing device, that manipulates and/or transforms data represented as physical (e.g., electronic) quantities within the computer's registers and/or memories into other data similarly represented as physical quantities within the computer's registers and/or memories or other information non-transitory storage medium that can store instructions to perform operations and/or processes.

The term set when used herein can include one or more items. Unless explicitly stated, the method embodiments described herein are not constrained to a particular order or sequence. Additionally, some of the described method embodiments or elements thereof can occur or be performed simultaneously, at the same point in time, or concurrently.

What is claimed is:

1. A computerized method of refining data from generative models, the method comprising, using one or more computer processors:
   assigning rankings to generative models;
   selecting a plurality of the generative models based on the assigned rankings, and sending a prompt to of the selected generative models, wherein the prompt comprises parameters input into removable blocks, the removable blocks presented on a graphical user interface (GUI), and wherein the selecting of the plurality of the generative models comprises selecting of the generative models for each of the removable blocks;
   inputting responses to the prompt by the selected generative models to an embedding layer of a machine learning model, the machine learning model different from the generative models;
   passing the inputted responses to the prompt through fully-connected feed forward layers of the machine learning model;
   outputting, by a SoftMax layer of the machine learning model, a refined response to the prompt, the outputting of the refined response comprising correcting for an error or a bias in of the responses to the prompt by of the selected generative models; and
   continuously retraining the machine learning model, the retraining using a plurality of labeled responses, wherein the plurality of labeled responses is generated by the machine learning model, and wherein each of the plurality of labeled responses is associated with one or more of the parameters input into the one or more removable blocks.

2. The method of claim 1, wherein the prompt comprises two or more sets of input parameters in a text format.

3. The method of claim 2, comprising training the machine learning model using past refined responses generated by the model.

4. The method of claim 1, wherein the outputting of the refined response comprises omitting contents from the refined response, wherein the omitted contents are included in of the responses by of the generative models.

5. The method of claim 3, wherein of the past refined responses are associated with of the input parameters of the two or more sets of input parameters.

6. The method of claim 2, comprising executing a web search query, the query generated using of the input parameters; and
wherein the refined response comprises results to the executed query.

7. The method of claim 1, comprising automatically executing an output code, the output code included in the refined response.

8. A system for refining data from generative models, the system comprising:
a memory; and
one or more computer processors configured to:
assign rankings to generative models;
select a plurality of the generative models based on the assigned rankings, and send a prompt to of the selected generative models, wherein the prompt comprises parameters input into removable blocks, the removable blocks presented on a graphical user interface (GUI), and wherein the selecting of the plurality of the generative models comprises selecting of the generative models for each of the removable blocks;
input responses to the prompt by the selected generative models to an embedding layer of a machine learning model, the machine learning model different from the generative models;
pass the inputted responses to the prompt through fully-connected feed forward layers of the machine learning model;
output, by a SoftMax layer of the machine learning model, a refined response to the prompt, the outputting of the refined response comprising correcting for an error or a bias in of the responses to the prompt by of the selected generative models; and
continuously retrain the machine learning model, the retraining using a plurality of labeled responses, wherein the plurality of labeled responses is generated by the machine learning model, and wherein each of the plurality of labeled responses is associated with of the parameters input into the removable blocks.

9. The system of claim 8, wherein the prompt comprises two or more sets of input parameters in a text format.

10. The system of claim 9, wherein of the processors is to train the machine learning model using past refined responses generated by the model.

11. The system of claim 8, wherein the outputting of the refined response comprises omitting contents from the refined response, wherein the omitted contents are included in of the responses by of the generative models.

12. The system of claim 10, wherein of the past refined responses are associated with of the input parameters of the two or more sets of input parameters.

13. The system of claim 9, wherein of the processors is to execute a web search query, the query generated using of the input parameters; and
wherein the refined response comprises results to the executed query.

14. The system of claim 9, wherein of the processors is to automatically execute an output code, the output code included in the refined response.

15. A computerized method of generating data from generative artificial intelligence (GenAI) model outputs, the method comprising, using one or more computer processors:
computing scores for GenAI models;
transmitting an GenAI prompt to a plurality of the GenAI models based on the computed scores, wherein the GenAI prompt comprises parameters input into removable blocks, the removable blocks presented on a graphical user interface (GUI), and wherein the GenAI prompt is transmitted to one or more GenAI models for each of the removable blocks;
inputting outputs to the GenAI prompt by the GenAI models to an embedding layer of a large language model (LLM), the LLM different from the GenAI models;
passing the inputted outputs to the GenAI prompt through fully-connected feed forward layers of the LLM;
generating, by a SoftMax layer of the LLM, a final output to the GenAI prompt, the generating of the final output comprising correcting for an error or a bias in of the outputs to the GenAI prompt by of the GenAI models; and
continuously retraining the LLM, the retraining using a plurality of labeled outputs, wherein the plurality of labeled outputs is generated by the LLM, and wherein each of the plurality of labeled outputs is associated with of the parameters input into the removable blocks.

16. The method of claim 15, wherein the GenAI prompt comprises two or more groups of parameters in a JavaScript object notation (JSON) format.

17. The method of claim 16, comprising tuning the LLM using past final outputs generated by the model.

18. The method of claim 15, wherein the generating of the final output comprises excluding contents from the final output, wherein the excluded contents are included in of the outputs by of the GenAI models.

19. The method of claim 17, wherein of the past final outputs are associated with of the parameters of the two or more groups of parameters.

20. The method of claim 15, comprising automatically executing an output computer program, the output computer program included in the final output.

* * * * *